(12) United States Patent
Fogg et al.

(10) Patent No.: US 8,912,476 B2
(45) Date of Patent: Dec. 16, 2014

(54) AUTOMATIC VEHICLE EXTERIOR LIGHT CONTROL SYSTEM ASSEMBLIES

(71) Applicant: Gentex Corporation, Zeeland, MI (US)

(72) Inventors: Jeremy A. Fogg, Holland, MI (US); Gregory M. Ejsmont, Grand Rapids, MI (US); Darin D. Tuttle, Byron Center, MI (US); Joseph S. Stam, Holland, MI (US)

(73) Assignee: Gentex Corporation, Zeeland, MI (US)

( * ) Notice: Subject to any disclaimer, the term of this patent is extended or adjusted under 35 U.S.C. 154(b) by 24 days.

(21) Appl. No.: 13/855,912

(22) Filed: Apr. 3, 2013

(65) Prior Publication Data
US 2013/0235600 A1  Sep. 12, 2013

Related U.S. Application Data

(63) Continuation of application No. 10/783,273, filed on Feb. 20, 2004, now abandoned.

(60) Provisional application No. 60/448,793, filed on Feb. 21, 2003.

(51) Int. Cl.
H01L 27/00 (2006.01)
F21S 8/10 (2006.01)
B60Q 1/14 (2006.01)
B60R 1/12 (2006.01)

(52) U.S. Cl.
CPC ............... *F21S 48/17* (2013.01); *B60Q 1/1423* (2013.01); *B60R 2001/1223* (2013.01); *B60R 2001/1253* (2013.01)

USPC .......................................... 250/208.1; 250/216

(58) Field of Classification Search
USPC .............................................. 250/216, 208.1
See application file for complete search history.

(56) References Cited

U.S. PATENT DOCUMENTS

| 4,139,801 A | 2/1979 | Linares |
| 4,236,099 A | 11/1980 | Rosenblum |
| 4,357,558 A | 11/1982 | Massoni et al. |
| 4,376,909 A | 3/1983 | Tagmi et al. |
| 4,599,544 A | 7/1986 | Martin |
| 4,665,321 A | 5/1987 | Chang et al. |
| 4,692,798 A | 9/1987 | Seko et al. |
| 4,708,410 A * | 11/1987 | Mazaki ...................... 312/138.1 |
| 4,727,290 A | 2/1988 | Smith et al. |
| 4,768,135 A | 8/1988 | Kretschmer et al. |
| 4,862,037 A | 8/1989 | Farber et al. |
| 4,930,742 A | 6/1990 | Schofield et al. |
| 4,967,319 A | 10/1990 | Seko |
| 5,036,437 A | 7/1991 | Macks |
| 5,072,154 A | 12/1991 | Chen |
| 5,086,253 A | 2/1992 | Lawler |
| 5,124,549 A * | 6/1992 | Michaels et al. .......... 250/237 R |
| 5,182,502 A | 1/1993 | Slotkowski et al. |

(Continued)

FOREIGN PATENT DOCUMENTS

CH     505705    4/1971
DE    2946561    5/1981

(Continued)

*Primary Examiner* — Tony Ko
(74) *Attorney, Agent, or Firm* — Price Heneveld LLP; Scott P. Ryan

(57) ABSTRACT

The present invention relates to various improvements relating to automatic vehicle equipment control systems.

18 Claims, 23 Drawing Sheets

(56) References Cited

U.S. PATENT DOCUMENTS

| | | |
|---|---|---|
| 5,187,383 A | 2/1993 | Taccetta et al. |
| 5,235,178 A | 8/1993 | Hegyi |
| 5,329,206 A | 7/1994 | Slotkowski et al. |
| 5,416,318 A | 5/1995 | Hegyi |
| 5,426,294 A | 6/1995 | Kobayashi et al. |
| 5,434,407 A | 7/1995 | Bauer et al. |
| 5,451,822 A | 9/1995 | Bechtel et al. |
| 5,471,515 A | 11/1995 | Fossum et al. |
| 5,508,592 A | 4/1996 | Lapatovich et al. |
| 5,537,003 A | 7/1996 | Bechtel et al. |
| 5,550,677 A | 8/1996 | Schofield et al. |
| 5,614,788 A | 3/1997 | Mullins et al. |
| 5,660,454 A | 8/1997 | Mori et al. |
| 5,666,028 A | 9/1997 | Bechtel et al. |
| 5,708,410 A | 1/1998 | Blank et al. |
| 5,715,093 A | 2/1998 | Schierbeek et al. |
| 5,796,094 A | 8/1998 | Schofield et al. |
| 5,811,888 A | 9/1998 | Hsieh |
| 5,812,321 A | 9/1998 | Scherbeek et al. |
| 5,837,994 A | 11/1998 | Stam et al. |
| 5,841,126 A | 11/1998 | Fossum et al. |
| 5,912,534 A | 6/1999 | Benedict |
| 5,923,027 A | 7/1999 | Stam et al. |
| 5,942,853 A | 8/1999 | Piscart |
| 5,988,056 A | 11/1999 | Bolch |
| 5,990,469 A | 11/1999 | Bechtel et al. |
| 6,008,486 A | 12/1999 | Stam et al. |
| 6,049,171 A | 4/2000 | Stam et al. |
| 6,097,023 A | 8/2000 | Schofield et al. |
| 6,130,421 A | 10/2000 | Bechtel et al. |
| 6,144,158 A | 11/2000 | Beam |
| 6,376,824 B1 | 4/2002 | Michenfelder et al. |
| 6,396,040 B1 | 5/2002 | Hill |
| 6,396,397 B1 | 5/2002 | Bos et al. |
| 6,429,594 B1 * | 8/2002 | Stam et al. .............. 315/82 |
| 6,483,438 B2 | 11/2002 | Deline et al. |
| 7,652,686 B2 | 1/2010 | Stiller |
| 7,825,600 B2 | 11/2010 | Stam et al. |
| 2002/0040962 A1 | 4/2002 | Schofield et al. |

FOREIGN PATENT DOCUMENTS

| | | |
|---|---|---|
| DE | 3900667 | 7/1990 |
| DE | 4016570 | 9/1991 |
| DE | 19820348 | 11/1999 |
| FR | 2641237 | 7/1990 |
| FR | 2726144 | 4/1996 |
| GB | 2102117 | 1/1983 |
| JP | 06018779 | 1/1994 |
| JP | 8166221 | 6/1996 |
| JP | 11125671 | 5/1999 |
| JP | 2000055614 | 2/2000 |
| WO | WO8605147 | 9/1986 |

* cited by examiner

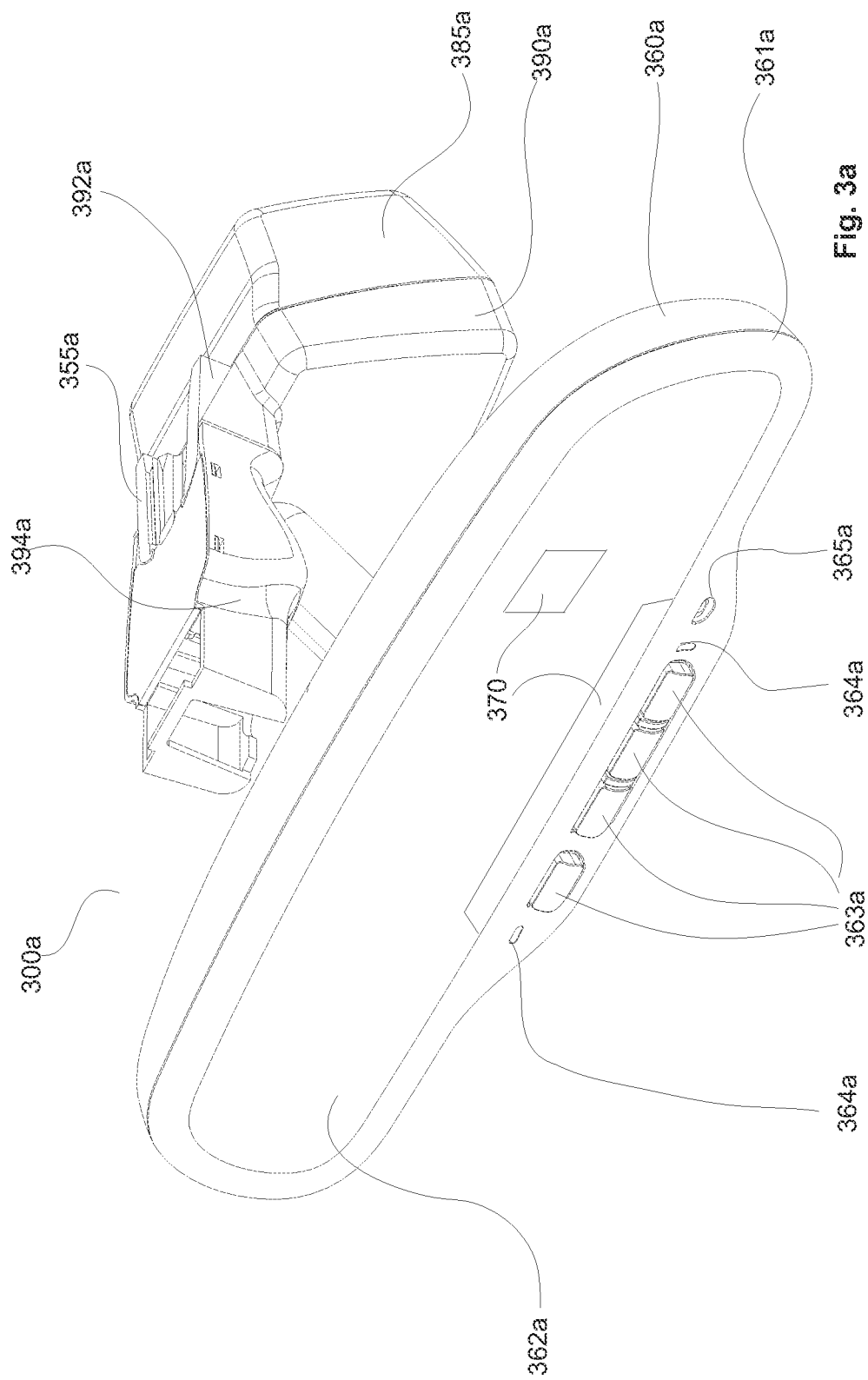

AUTOMATIC VEHICLE EXTERIOR LIGHT CONTROL SYSTEM ASSEMBLIES

CROSS REFERENCE TO RELATED APPLICATIONS

This application is a continuation of U.S. patent application Ser. No. 10/783,273 filed Feb. 20, 2004, and now published as U.S. Pat. App. Publ. No. 2004/0164228, which claims priority, under 35 U.S.C. §119(e), to U.S. provisional patent application Ser. No. 60/448,793, filed on Feb. 21, 2003. The disclosure of the above mentioned applications are hereby incorporated herein in their entirety by reference.

BACKGROUND OF THE INVENTION

Automatic vehicle exterior light control systems provide a significant convenience function for drivers by alleviating the burden of manually switching between high and low beam headlights in response to changing traffic conditions. It is known that drivers, on average, do not utilize their high beam headlights as often as is appropriate. High beam headlights can provide from two to four, or more, times the visibility distance at night as compared to low beam headlights. Thereby, a driver of a controlled vehicle is enabled to detect an obstacle or pedestrian at night earlier than otherwise would be the case. There is a safety benefit during night time driving introduced by automating the beam switching task and increasing the average utilization of high beam headlights.

Known systems designed to automatically control vehicle exterior lights utilize a forward looking digital imaging system to acquire images of the scene generally in front of the controlled vehicle, to analyze the images and to detect headlights of oncoming vehicles and taillights of leading vehicles. It has become apparent that repeatable and predictable vehicle to vehicle system operation suffers when misalignment is present in the corresponding imaging assemblies.

What are needed are automatic vehicle exterior light control systems that provide improved features to accurately detect related images generally forward of a controlled vehicle. Systems configured to automatically account for minor imager assembly misalignments are also needed.

SUMMARY OF THE INVENTION

The present invention provides automatic vehicle exterior light control systems that provide improved features to accurately detect related images generally forward of a controlled vehicle. Systems configured to automatically account for minor imager assembly misalignments are also provided.

In at least one embodiment, an imager assembly mounting means is provided that insures accurate alignment of an imager assembly with respect to the desired field of view. In a related embodiment, an imager assembly mounting means provides for quick installation within an associated controlled vehicle.

In at least one embodiment, features are provided within the imager assembly mounting means that insure proper selection for the specific controlled vehicle requirements. In a related embodiment, incorrect assembly is prevented.

In at least one embodiment, an imager assembly mounting means is provided that exploits use of snap together components for quick and efficient manufacturing. In a related embodiment, a minimum of tools are required for assembling the imager assembly mounting means.

In at least one embodiment, various improvements of the present invention are integrated with other vehicular systems. In at least one related embodiment, the various integrated systems are configured to share components for improved operation and, or, to lower associated costs.

Other advantages of the present invention will become apparent when reading the following detail description in light of the figures, examples and appended claims.

BRIEF DESCRIPTION OF THE FIGURES

FIG. 3a depicts a perspective view of an interior rearview mirror assembly;

DETAILED DESCRIPTION OF THE INVENTION

Figure 1:
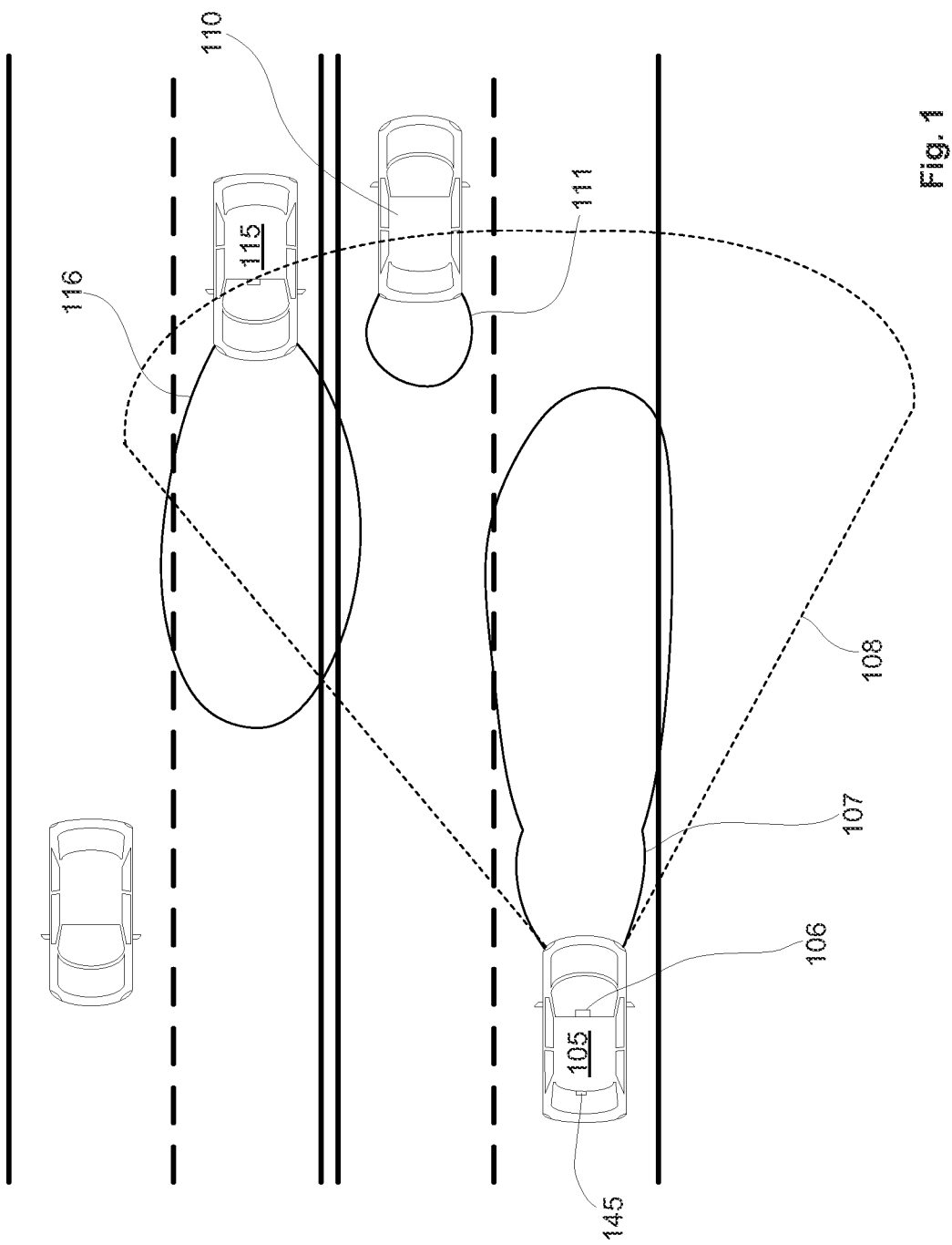
FIG. 1 depicts a controlled vehicle relative to the taillights of a leading vehicle and the headlights of an oncoming vehicle.

Referring initially to FIG. 1, for illustrative purposes, an automatic vehicle exterior light control system 106 is shown to be installed within a controlled vehicle 105. Although the control system 106 is depicted to be integral with the interior rearview mirror assembly, it should be understood that the control system, or any of the individual components thereof, may be mounted in any suitable location within the interior, or on the exterior, of the controlled vehicle 105. The term "controlled vehicle" is used herein with reference to a vehicle comprising an automatic vehicle exterior light control system. Suitable locations for mounting the associated image sensor are those locations that provide an unobstructed view of the scene generally forward of the controlled vehicle 105 and allow for detection of headlights 116 of oncoming vehicles 115 and taillights 111 of leading vehicles 110 within the glare zone 108 associated with the controlled vehicle.

Figure 2:
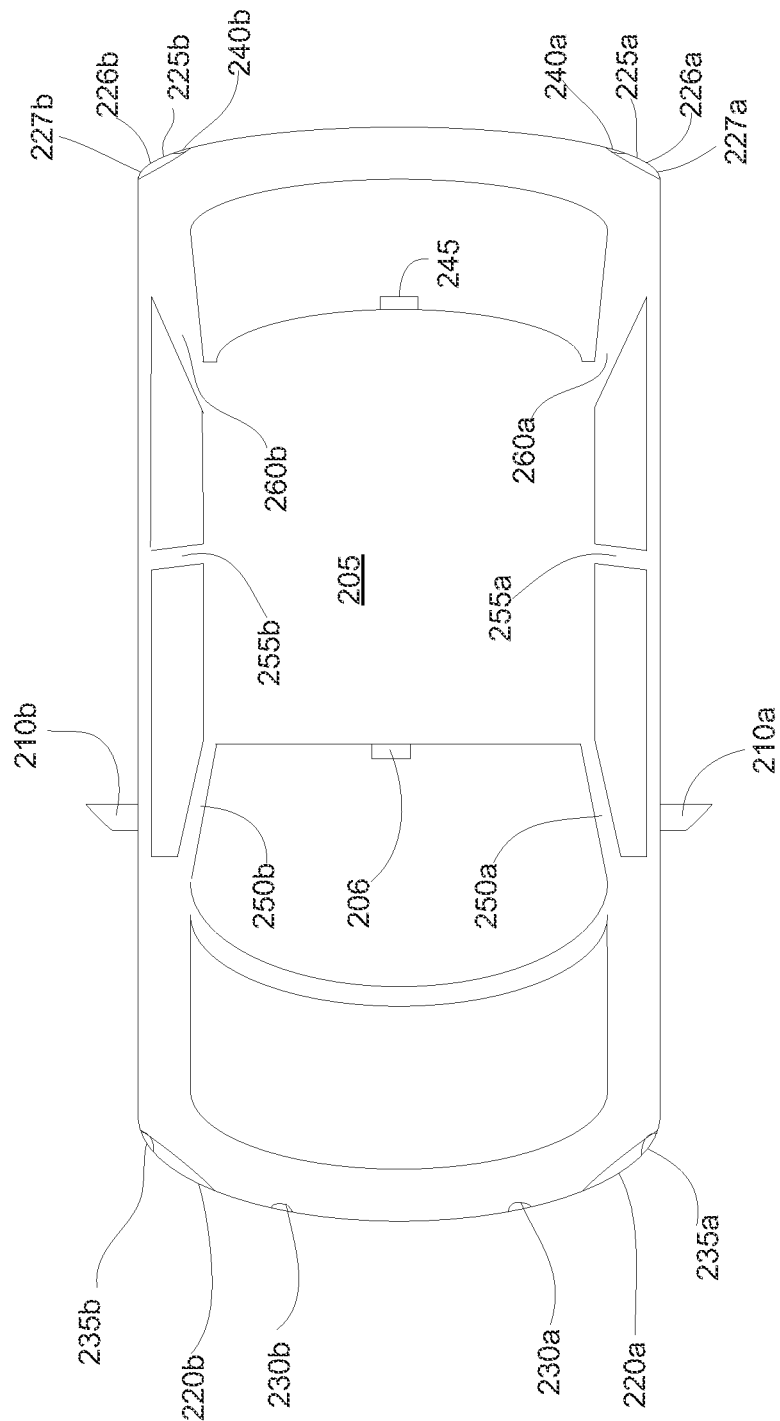
FIG. 2 depicts a controlled vehicle.

FIG. 2 depicts a controlled vehicle 205 comprising an interior rearview mirror assembly 206 incorporating an automatic vehicle exterior light control system. The processing and control system functions to send configuration data to the imager, receive image data from the imager, to process the images and to generate exterior light control signals. Detailed descriptions of such automatic vehicle exterior light control systems are contained in commonly assigned U.S. Pat. Nos. 5,837,994, 5,990,469, 6,008,486, 6,130,448, 6,130,421, 6,049,171, 6,465,963, 6,403,942, 6,587,573, 6,611,610, 6,621,616, 6,631,316 and U.S. patent application Ser. Nos. 10/208,142, 09/799,310, 60/404,879, 60/394,583, 10/235,476 and 09/800,460 and; the disclosures of which are incorporated herein in their entireties by reference. The controlled vehicle is also depicted to include a driver's side outside rearview mirror assembly 210a, a passenger's side outside rearview mirror assembly 210b, a center high mounted stop light (CHMSL) 245, A-pillars 250a, 250b, B-pillars 255a, 255b and C-pillars 260a, 260b; it should be understood that any of these locations may provide alternate locations for an image sensor, image sensors or related processing and, or, control components. It should be understood that any, or all, of the rearview mirrors may be automatic dimming electro-optic mirrors. The controlled vehicle is depicted to include a host of exterior lights including headlights 220a, 220b, foil weather lights 230a, 230b, front turn indicator/hazard lights 235a, 235b, tail lights 225a, 225b, rear turn indicator lights 226a, 226b, rear hazard lights 227a, 227b and backup lights 240a, 240b. It should be understood that additional exterior lights may be provided, such as, separate low beam and high beam headlights, integrated lights that comprise multipurpose lighting, etc. It should also be understood that any of the exterior lights may be provided with positioners (not shown) to adjust the associated optical axis of the given exterior light. It should be understood that the controlled vehicle of FIG. 2 is generally for illustrative purposes and that suitable automatic vehicle exterior light control systems, such as those disclosed in the patents and patent applications incorporated herein by reference, may be employed along with other features described herein and within disclosures incorporated herein by reference.

Figure 3B:
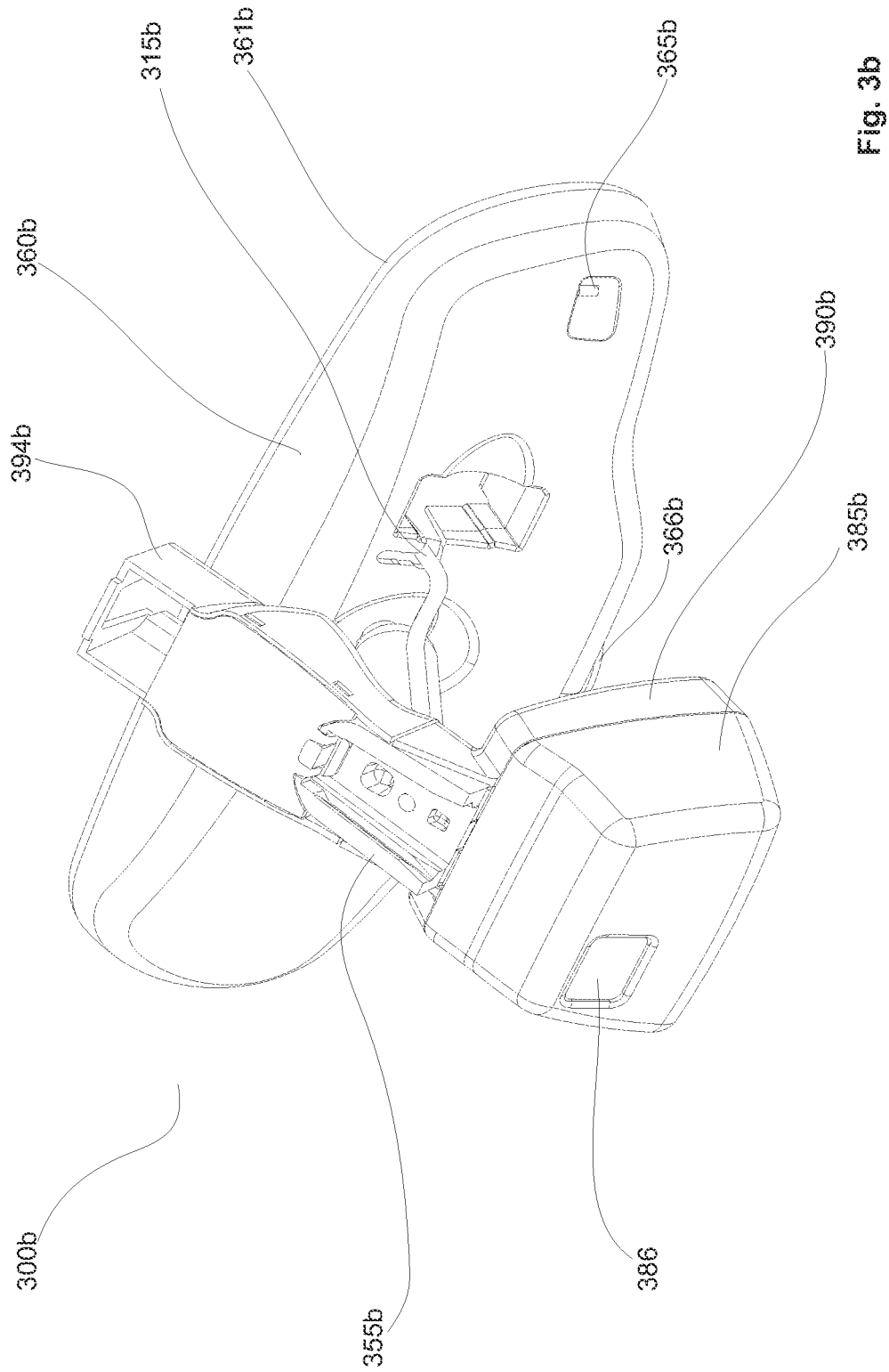
FIG. 3b depicts a second perspective view of the mirror assembly of FIG. 3.

Turning now to FIGS. 3a and 3b, an embodiment of an interior rearview mirror assembly 300a, 300b is shown. The mirror assembly includes a stationary accessory assembly enclosed within a front housing 385a, 385b and a rear housing 390a, 390b. The front housing comprises an aperture 386b defining an image sensor visual opening. The stationary accessory assembly along with a rearview mirror are carried by an attachment member 355a, 355b. The rearview mirror comprises a mirror housing 360a, 360b, a bezel 361a, 361b and a mirror element 362a. A wire cover 394a, 394b is included to conceal related wiring 315b. The rearview mirror assembly 300a, 300b also incorporates an ambient light sensor 365b, at least one microphone 366b, a glare light sensor 365a, operator interfaces 363a, indicators 364a and at least one information display 370.

When viewed from an image sensor's perspective, and as used herein, the x-axis is a longitudinal axis associated with a controlled vehicle (i.e. the optical axis of the image sensor), the y-axis is a cross-car axis associated with a controlled vehicle (i.e. horizontal axis of the image sensor) and the z-axis is a vertical axis of an associated controlled vehicle (i.e. vertical axis of the image sensor). Vertical rotation of the image sensor refers to rotation about the y-axis, defined in terms of up/down angular motion. Horizontal rotation of the image sensor refers to rotation about the z-axis, defined in terms of left/right angular motion. Skew rotation of the image sensor refers to rotation about the x-axis. Angular variation of an imager board installed in a controlled vehicle has a direct effect on the optical axis of the image sensor. Angular rotation shifts the "sweet spot" and the field of view causing increased field limit in one direction and decreased field limit in another direction. Positional variation of an imager board installed in a controlled vehicle has minimal effect on performance of an associated automatic vehicle exterior light control system. Millimeters of positional movement, which is a typical tolerance, causes little angular variation of the optical axis (i.e. typically less than 0.001 degree) at distances of 300 meters or greater. A preferred nominal image sensor field of view when incorporated in an automatic vehicle exterior light control system is approximately 12 degrees left, approximately 12 degrees right, approximately 4 degrees up and approximately 4 degrees down with respect to the optical axis.

Associated mechanical variations may be due to anyone, or a combination, of: 1) carrier/baffle tolerance, board surface; 2) carrier/baffle tolerance, registration portions; 3) attachment member, carrier/baffle mounting surface; 4) attachment member, button receptacle and 5) imager board thickness. Table 1 summarizes angular variations.

TABLE 1

Agular Variation Study

| Source of Variation | Preferred Max | Up/Down | Right/Left |
|---|---|---|---|
| Carrier/Baffle - imager board mounting | 0.2 mm Surf | +/−0.401 deg | +/−0.316 deg |
| Carrier/baffle - registration portions | 0.2 mm Surf | +/−0.318 deg | +/−0.249 deg |
| Attachment member - carrier/baffle | 0.13 mm Surf | +/−0.207 deg | +/−0.162 deg |
| Attachment member - button recepticle | 0.1 mm Surf | +/−0.215 deg | +/−0.316 deg |
| Imager board thickness | +/−0.005" | +/−0.260 deg | +/−0.140 deg |
| Total | | +/−1.401 | +/−1.183 deg |

Expected controlled vehicle level variations may include anyone or combinations of: 1) windshield form, sag tolerance; 2) sheet metal variation; 3) adhesive thickness; 4) windshield position; 5) button position; 6) button rotation; 7) "Bigfoot" button; 8) button adhesive; 9) vehicle attitude build variation and 10) vehicle load. Tables 2 through 4 contain summaries of data related to vehicle level variations.

TABLE 2

Image Sensor Optical Axis Angular Variation versus Windshield Angle and Button Rotation

| Windshield Angle | 1 degree button rotation | | | 2 degree button rotation | | | 3 degree button rotation | | | 4 degree button rotation | | |
|---|---|---|---|---|---|---|---|---|---|---|---|---|
| | H | V | S | H | V | S | H | V | S | H | V | S |
| 20 | 0.940° | 0.003° | 0.342° | 1.879° | 0.011° | 0.684° | 2.819° | 0.025° | 1.026° | 3.759° | 0.045° | 1.368° |
| 30 | 0.866° | 0.004° | 0.500° | 1.732° | 0.015° | 1.000° | 2.598° | 0.034° | 1.500° | 3.464° | 0.060° | 2.000° |

TABLE 2-continued

Image Sensor Optical Axis Angular Variation versus Windshield Angle and Button Rotation

| Wind-shield Angle | 1 degree button rotation | | | 2 degree button rotation | | | 3 degree button rotation | | | 4 degree button rotation | | |
|---|---|---|---|---|---|---|---|---|---|---|---|---|
| | H | V | S | H | V | S | H | V | S | H | V | S |
| 40 | 0.766° | 0.004° | 0.643° | 1.532° | 0.017° | 1.286° | 2.298° | 0.039° | 1.928° | 3.064° | 0.069° | 2.571° |
| 50 | 0.643° | 0.004° | 0.766° | 1.286° | 0.017° | 1.532° | 1.928° | 0.039° | 2.298° | 2.571° | 0.069° | 3.064° |
| 60 | 0.500° | 0.004° | 0.866° | 1.000° | 0.015° | 1.732° | 1.500° | 0.034° | 2.598° | 2.000° | 0.06°0 | 3.464° |
| 70 | 0.342° | 0.003° | 0.940° | 0.684° | 0.011° | 1.879° | 1.026° | 0.025° | 2.819° | 1.368° | 0.045° | 3.759° |

TABLE 3

Angular Variation Study

| | Preferred maximum | Up/Down | Right/Left |
|---|---|---|---|
| Windshield Sag | +/−3.5 mm | +/−0.615 deg | +/−0.006 deg |
| Sheet Metal Variation | +/−3 mm | +/−0.24 deg | +/−0.24 deg |
| Adhesive Thickness | +/−3.5 mm | +/−0.52 deg | +/−0.26 deg |
| Windshield Position | +/−3 mm | +/−0.03 deg | +/−0.08 deg |
| Button Position | +/−6 mm | +/−0.09 deg | +/−0.13 deg |
| Button Rotation | +/−1.5 deg | +/−0.003 deg | +/−1.34 deg |
| Total | | +/−1.498 deg | +/−2.056 deg |
| Bigfoot Button | | +/−0.38 deg | +/−0.35 deg |
| Vehicle Build Variation | | +/−0.8 deg | |
| Vehicle Load Study | | +/−0.7 deg | |

TABLE 4

Angular Variation Study

| Mechanical Variables | Preferred Maximum | Up/Down | Right/Left |
|---|---|---|---|
| Carrier/Baffle - Imager Board | 0.2 mm Surf | +/−0.401 deg | +/−0.316 deg |
| Carrier/Baffle - registration portion surface | 0.2 mm Surf | +/−0.318 deg | +/−0.249 deg |
| Attachment member - Carrier/Baffle | 0.13 mm Surf | +/−0.207 deg | +/−0.162 deg |
| Attachment member - Button receptacle | 0.1 mm Surf | +/−0.215 deg | +/−0.316 deg |
| Imager Board Thickness | +/−0.005" | +/−0.260 deg | +/−0.140 deg |
| Total | | +/−1.401 | +/−1.183 deg |
| Vehicle Variables | Spec | Up/Down | Right/Left |
| Windshield Sag | +/−3.5 mm | +/−0.615 deg | +/−0.006 deg |
| Sheet Metal Variation | +/−3 mm | +/−0.24 deg | +/−0.24 deg |
| Adhesive Thickness | +/−3.5 mm | +/−0.52 deg | +/−0.26 deg |
| Windshield Position | +/−3 mm | +/−0.03 deg | +/−0.08 deg |
| Button Position | +/−6 mm | +/−0.09 deg | +/−0.13 deg |
| Button Rotation | +/−1.5 deg | +/−0.003 deg | +/−1.34 deg |
| Total | | +/−1.498 deg | +/−2.056 deg |
| Total Mechanical and Vehicle Variables | | +/−2.899 deg | +/−3.239 deg |
| Statistically Probable Variation (3σ) | | +/−1.065 deg | +/−1.501 deg |
| SPV with Veh Load, Build and Bigfoot (3σ) | | +/−1.552 deg | +/−1.501 deg |
| SPV with 0.75 Degree Button Rot (3σ) | | +/−1.065 deg | +/−0.95 deg |
| SPV with 3.0 Degree Button Rot (3σ) | | +/−1.065 deg | +/−2.76 deg |
| SPV with 5.0 Degree Button Rot (3σ) | | +/−1.065 deg | +/−4.51 deg |

Figure 4:
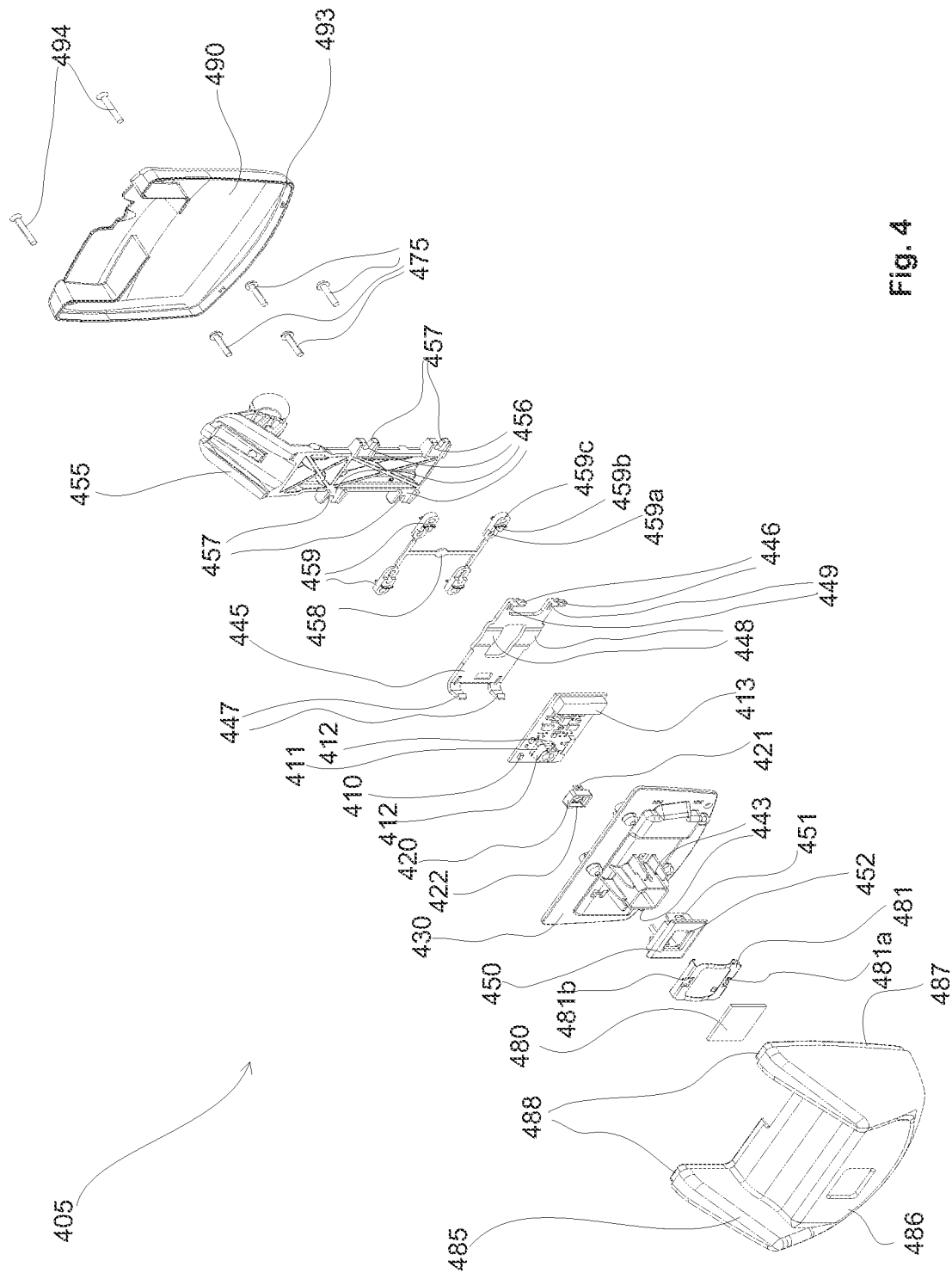
FIG. 4 depicts a perspective view of an exploded stationary assembly.
Figure 5:
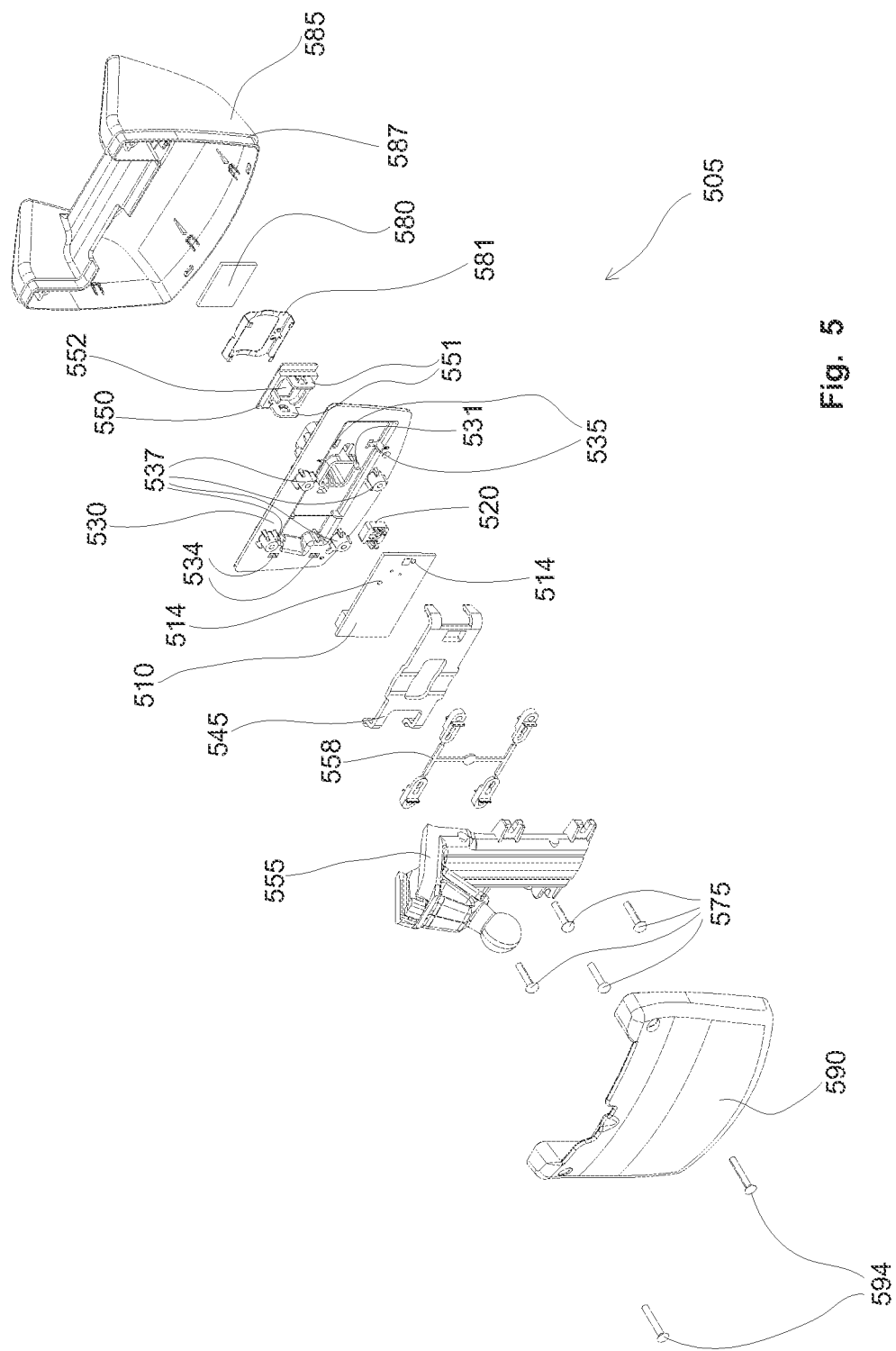
FIG. 5 depicts a second perspective view of the stationary assembly of FIG. 4.

Turning now to FIGS. 4 and 5, there are shown exploded, perspective, views of an accessory and rearview mirror mount assembly 405, 505. In a preferred embodiment, the accessory and rearview mirror mount assembly provides a rigid structure for mounting a repositionably mounted interior rearview mirror along with a stationarily mounted image sensor. As will be described in detail herein, the preferred accessory and rearview mirror mount assembly facilitates ease of assembly as well as provides for repeatable, reliable and precise alignment of the related components. In at least one embodiment, the associated imager is used for automatic exterior vehicle light control for which precision alignment of the image sensor is preferred.

Imager board 410, 510 is provided with an image sensor with lens 411. In a preferred embodiment, the imager board will also include an image sensor control logic and timing circuit, communication line drivers and wire harness receptacle 413. Optionally, the imager board may comprise a processor for receiving and, at least partially, processing images obtained from the image sensor. In a preferred embodiment, the image sensor and at least one other device selected from the group comprising; 1) an image sensor control logic; 2) an A/D converter; 3) a low voltage differential signal line driver; 4) a temperature sensor; 5) a control output; 6) a voltage regulator; 7) a second image sensor; 8) a microprocessor; 9) a moisture sensor and 10) a compass are integrated in a common ASIC, most preferably on a common silicon wafer. Preferably, the image sensor with lens 411 includes lens cover snap portions 412 for engaging lens cover 420, 520 snap clips 421. The lens cover has an aperture 422 for alignment with the optical axis of the image sensor and lens. Various suitable optical systems, such as those depicted and described in commonly assigned U.S. Pat. Nos. 5,990,469; 6,008,486; 6,130,421; 6,130,448; 6,049,171; and 6,403,942 and; the disclosures of which are incorporated herein in their entireties by reference; may be employed.

An imager board wiring harness (not shown) is preferably provided with plugs on either end thereof. The imager board is preferably provided with a male receptacle 413 for receiving one of the plugs of the imager board wiring harness (not shown).

With additional reference to FIG. 5, a lens cover 420, 520 is snapped onto the lens and then the imager board is placed on the carrier/baffle 430, 530 such that the alignment pins 531, 831 are received within the alignment holes 514 such that the image sensor with lens 411 and lens cover are aligned with the baffle aperture 832. Preferably, the alignment pins and, or, holes are slightly tapered such that the pins are initially freely received within the alignment holes then become snug once the imager board is pressed into place upon the carrier/baffle. Preferably, the lens cover is further secured in place by the lens cover retainers 833. It should be understood that the baffle may be a separate part that snaps in place on a separate carrier.

Once the imager board is in place upon the carrier/baffle, the imager board retainer 445, 545 is placed such that the imager board is retained upon the carrier/baffle. Preferably, the imager board retainer comprises hinge portions 446 that are received within the hinge receptacles 534, 834 with the imager board retainer substantially perpendicular to the carrier/baffle. The imager board retainer is preferably then pivoted around the hinge portions such that the clip portions 447 are received within clip receptacles 535, 835 and retained therein via interlocking clips. It should be understood that the imager board retainer may be configured to snap in place at three, four or more points in lieu of the hinge portions on one end.

A far field baffle 450, 550 is snapped onto the carrier/baffle such that the aperture 452, 552 is aligned with the baffle aperture 832 and such that the far field baffle snap clips 451, 551 are engaged with far field snap portions 443 on either side of the baffle. The far field baffle, in part, defines the field of view of the associated image sensor.

The carrier/baffle 430, 530 is placed proximate the attachment member 455, 555, 655, 755 such that the registration portions 837 are received within the registration receptacles 456, 556, 656. Four fasteners 475, 575 are placed through fastener slots 457, 557, 657, 757 and received within fastener receptacles 841 to secure the carrier/baffle to the attachment member. Alternatively, an alignment shim assembly 458 may be provided with individually removable alignment shims 459. Each alignment shim is provided with at least a first graduation 459a and, preferably, with second and third graduations 459b, 459c, respectively. The alignment shims may provide a means for expanding the applicability of any one accessory and rearview mirror mount assembly 405, 505 to a broader array of vehicles and windshield configurations. Preferably, the fasteners are threaded screws and the fastener receptacles are provided with mating threads. Optionally, the fasteners and fastener receptacles may be configured with interference fit functionality such that the fasteners are pressed into the fastener receptacles. It should be understood that the carrier/baffle may be configured to snap onto the attachment member in lieu of using fasteners.

The transparent cover 480, 580 is attached to the front housing 485, 585 such that the transparent cover is fixed to the front housing to close the aperture 486. The transparent cover may be assembled with a spring clip 481 using housing interlocks 481a, 481b and spring clip interlocks (shown as elements 1589a, 1589b in FIG. 15). Preferably, the transparent cover is substantially transparent to light rays in the visible spectrum, however, incorporates an infrared and, or, ultra violet spectral filter characteristic. Thereby, substantially blocking infrared and, or, ultra violet light rays from impinging upon the image sensor. Front housing 485, 585 is preferable provided with a recessed periphery with snap interlock 487, 587 to engage an inner perimeter with snap interlock 493, of a rear housing 490, 590. The front housing and rear housing combine to define an enclosure.

Figure 8:
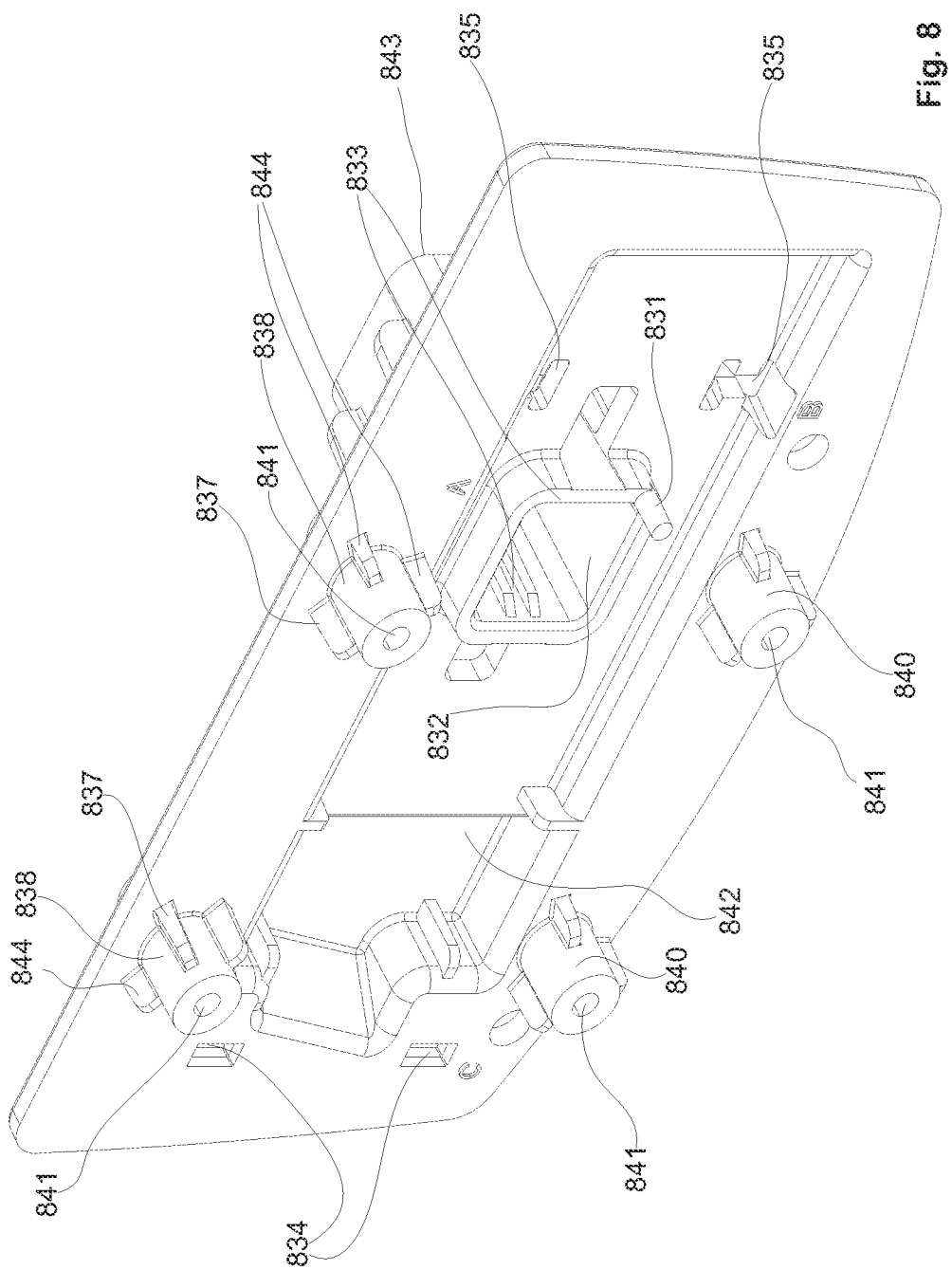
FIG. 8 depicts a perspective view of a carrier/baffle.

With further reference to FIG. 8, the carrier/baffle is preferable provided with a part match pin 844 that is located on an opposite side from a part match pin on the front or rear housing such that a particular carrier/baffle will only allow assembly with an appropriate housing. The part match pin is provided to allow for sure assembly of matching parts because it is envisioned that the carrier/baffle will be configured to match a specific vehicle windshield angle and wire cover. For example, a carrier/baffle for a 24.3 degree angle windshield vehicle that has a rear housing 490, 590 with a first wire cover will not work with a rear housing 490, 590 that does not have a wire cover (i.e. the part match pins will be aligned, thereby, prohibiting assembly). When the correct carrier/baffle is mated with the correspondingly correct rear housing, the part match pins will not be aligned and assembly will be impeded.

As further shown in FIG. 8, the carrier/baffle is provided with upper standoffs 838 and lower standoffs 840 which, in part, define the angle at which the associated image sensor board and compass sensors are placed with respect to an associated vehicle windshield. In a preferred embodiment, the angle may be selected by providing a predetermined upper and lower standoff length. In a preferred embodiment, the angle of the imager with respect to the windshield will range from approximately 20 to approximately 35 degrees, more preferably from approximately 24.3 to approximately 30 degrees. The preferred accessory and rearview mirror mount assembly will provide for this range with only changing the upper and/or lower standoff lengths. To further expand the accommodated windshield angles, the attachment member will be altered as described elsewhere herein.

Figure 6:
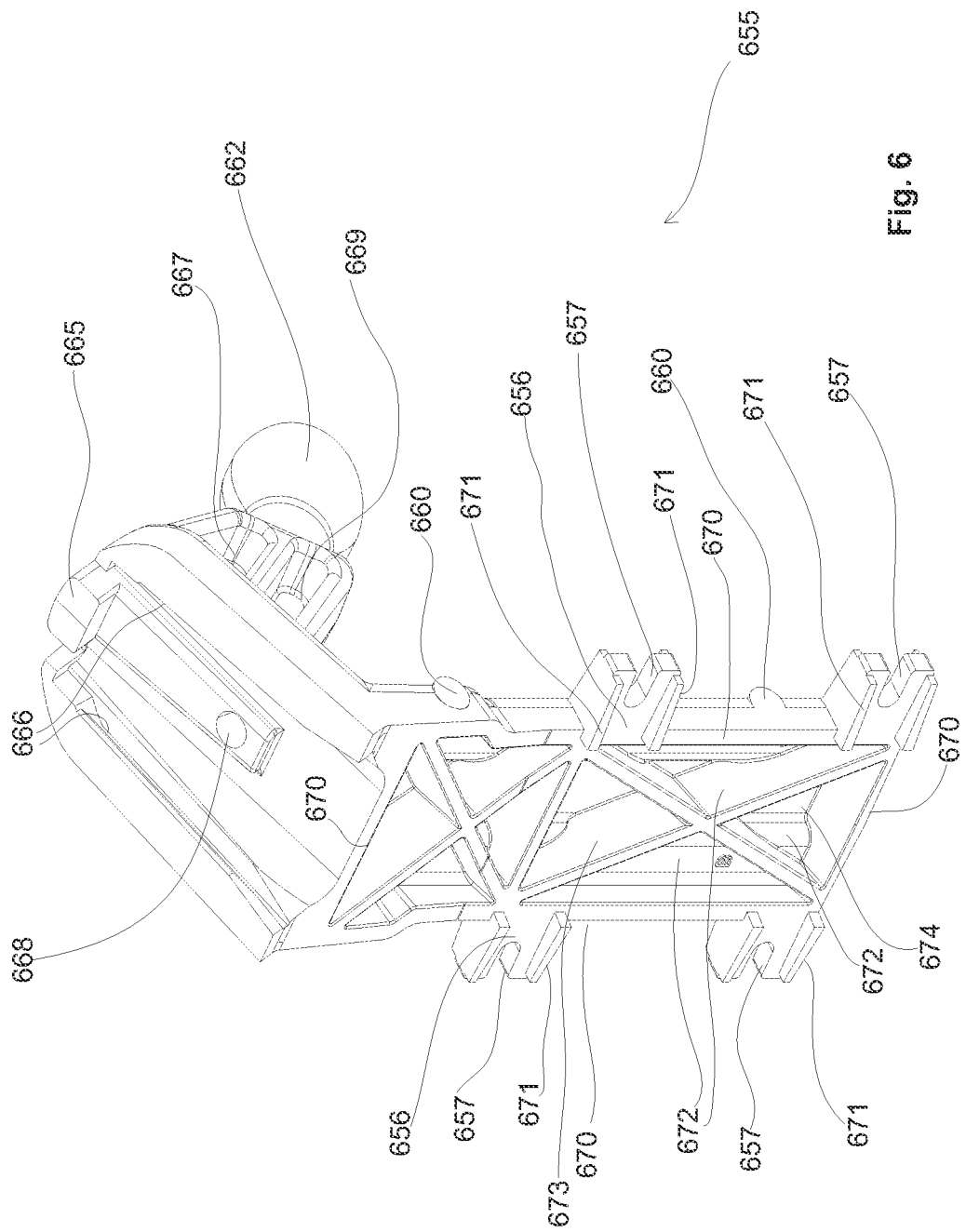
FIG. 6 depicts a perspective view of an attachment member.
Figure 7:
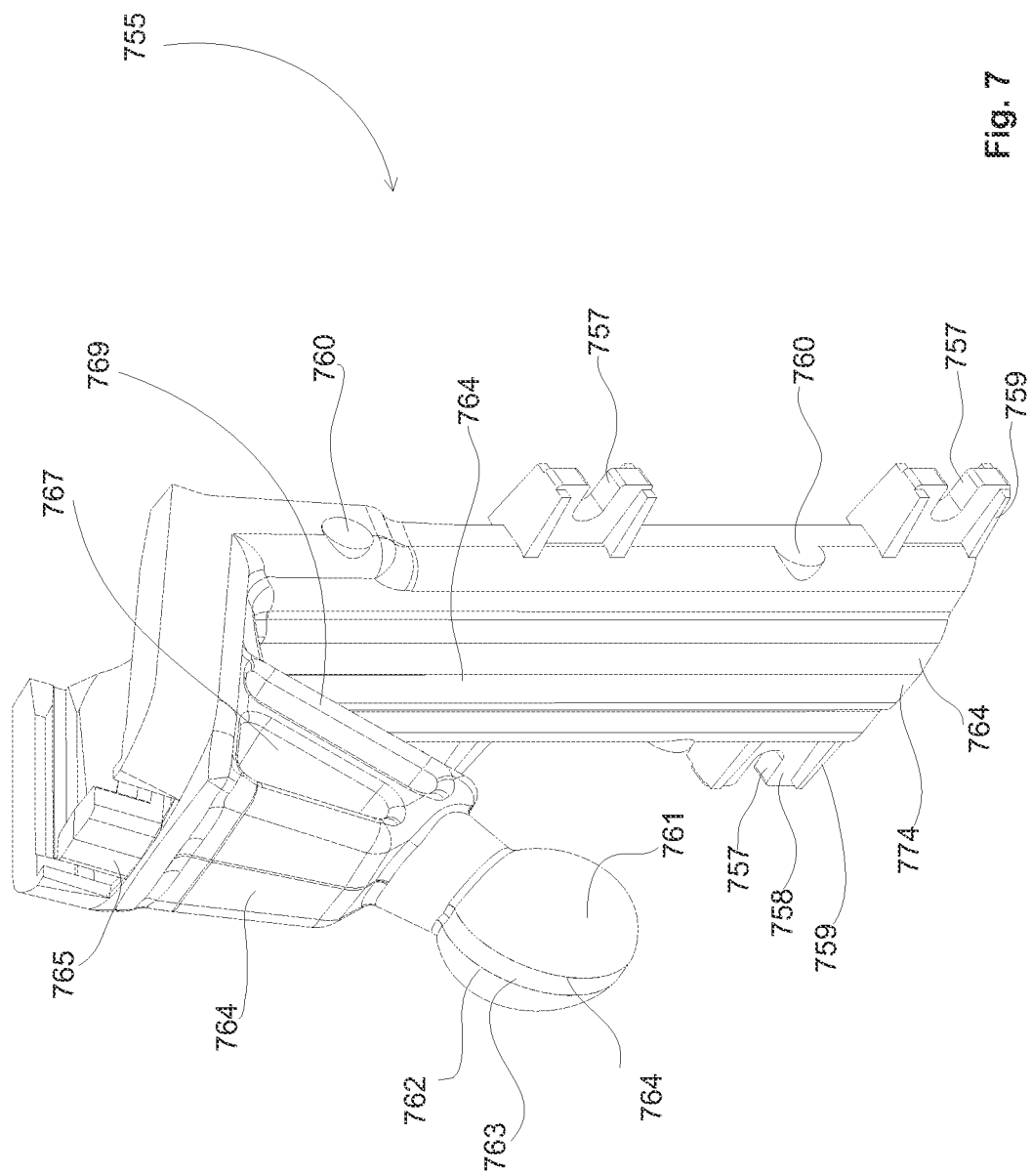
FIG. 7 depicts a second perspective of the attachment member of FIG. 6.

With additional reference to FIGS. 6 and 7, the attachment member 455, 555, 655, 755 are depicted in greater detail. The attachment member is configured to slidably engage a vehicle mounting button (not shown) in button receptacle 666 and to receive a rearview mirror on ball 662, 762. A lower portion of the attachment member is defined by the lower periphery 670, lower chamber 672 and lower cavity 673. The ribs 671 are provided to allow the attachment member to function as a substitute for the retainer 445, 545 when combined with an appropriately designed interposing member such as a piece of substantially elastic sheet. An upper portion is defined by the button receptacles 666, the accessory mount 665, an upper chamber 669, a threaded set screw hole 668 and an upper cavity 667. The upper and lower portions are preferably configured as shown in FIGS. 6 and 7 to maximize the strength while minimizing the resulting attachment member thickness in any given location. The thickness is desirably minimized to conserve material and to reduce associated shrinkage and warpage during manufacturing. Preferably, the attachment member is manufactured from an injection molded zinc process. Preferably, a mold is provided with a cavity that separates at least into four sections (a cover half, ejector half, and two slides) such that the, at least partially, solidified attachment member is ejected by applying force to the ejection pins 660, 760 and ejection point 761. When so ejected, the attachment member is provided with a clean mold separation line 763 on, at least, the ball 662, 762. Preferably, molten zinc is injected into a mold via apertures in the mold corresponding to mold fill locations 764. It should be understood that the associated mold may have more or less sections depending on the desired material and ability to reuse. It should be understood that inserts may be provided for the mold section portion that defines the upper and/or lower standoff lengths. Thereby, the same mold section may be used to produce various angle parts.

In a preferred embodiment, the attachment member is provided with stiffeners 759 located proximate the fastener slots 457, 657, 757. Most preferably, the attachment member is provided with a ground connector feature 758 for facilitating connection of the ground connector (shown as element 1417 in FIG. 14) along with at least one of the fasteners. It should be understood that alternate ground connector features may be provided.

As can be seen from FIGS. 4, 5, 6 and 7, the attachment member, in part, defines the relationship which the image sensor defines with respect to an associated field of view. The corresponding angle may be altered by changing the angle at which the upper portion of the attachment member defines with respect to the lower portion, varying the length of the registration portions of the carrier/baffle, providing shims of differing thicknesses, or any combination thereof. It should be apparent that other modifications may be made to vary the resulting imager aim. A windshield sealing boot (shown as element 1389, 1489 in FIGS. 13 and 14, respectively) may be provided to impede nuisance buildup on the transparent cover, such as, dust, windshield cleaner spray, moisture and the like.

It should be understood that materials other than zinc may be used for the attachment member such as steel, steel alloys, aluminum, aluminum alloy, rigid plastics, polymers, and the like. It is within the scope of the present invention to use composite materials such as fiber class, fiber reinforced plastics, etc.

Figure 9:
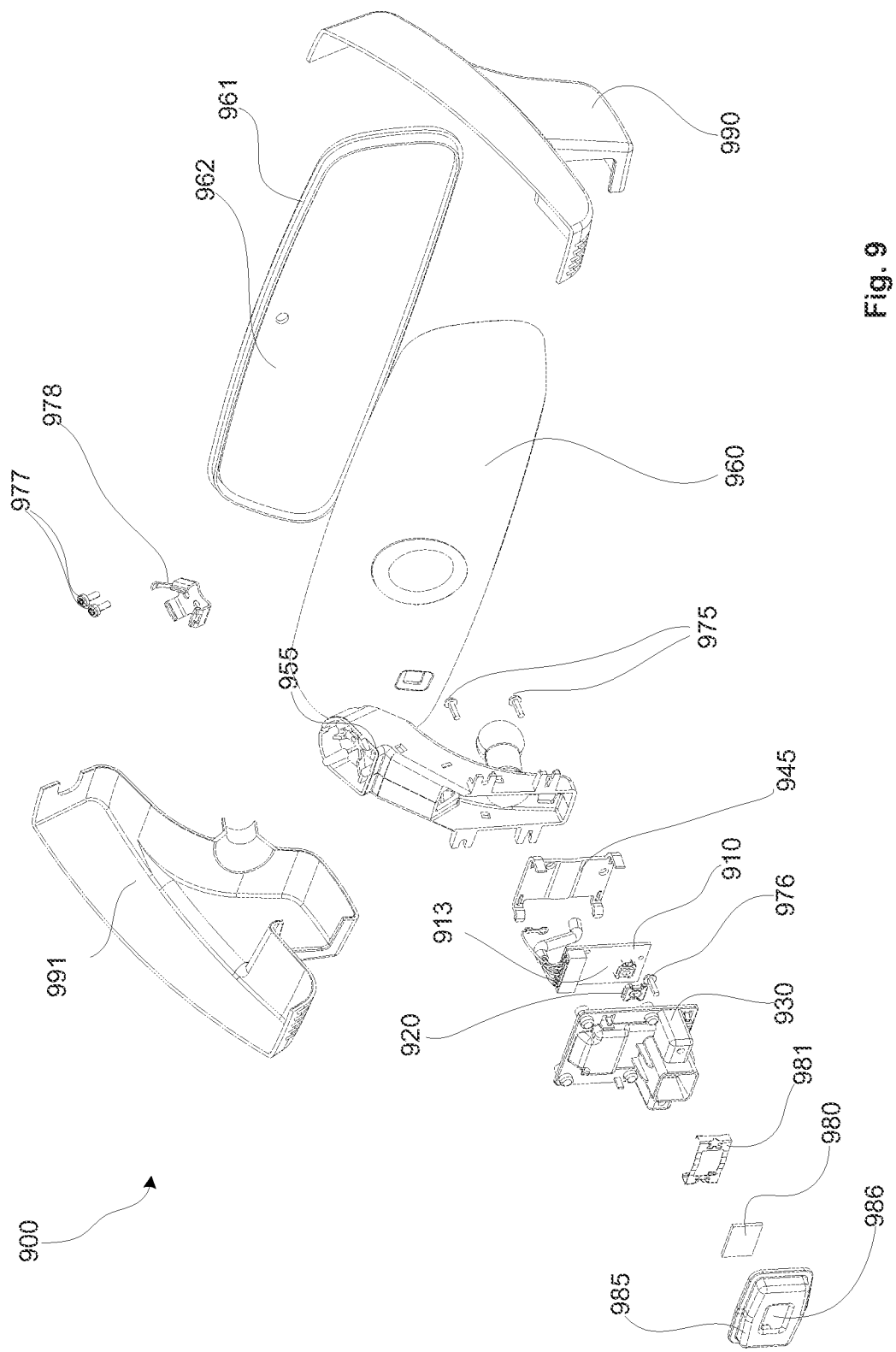
FIG. 9 depicts a perspective view of an exploded rearview mirror assembly.
Figure 10:
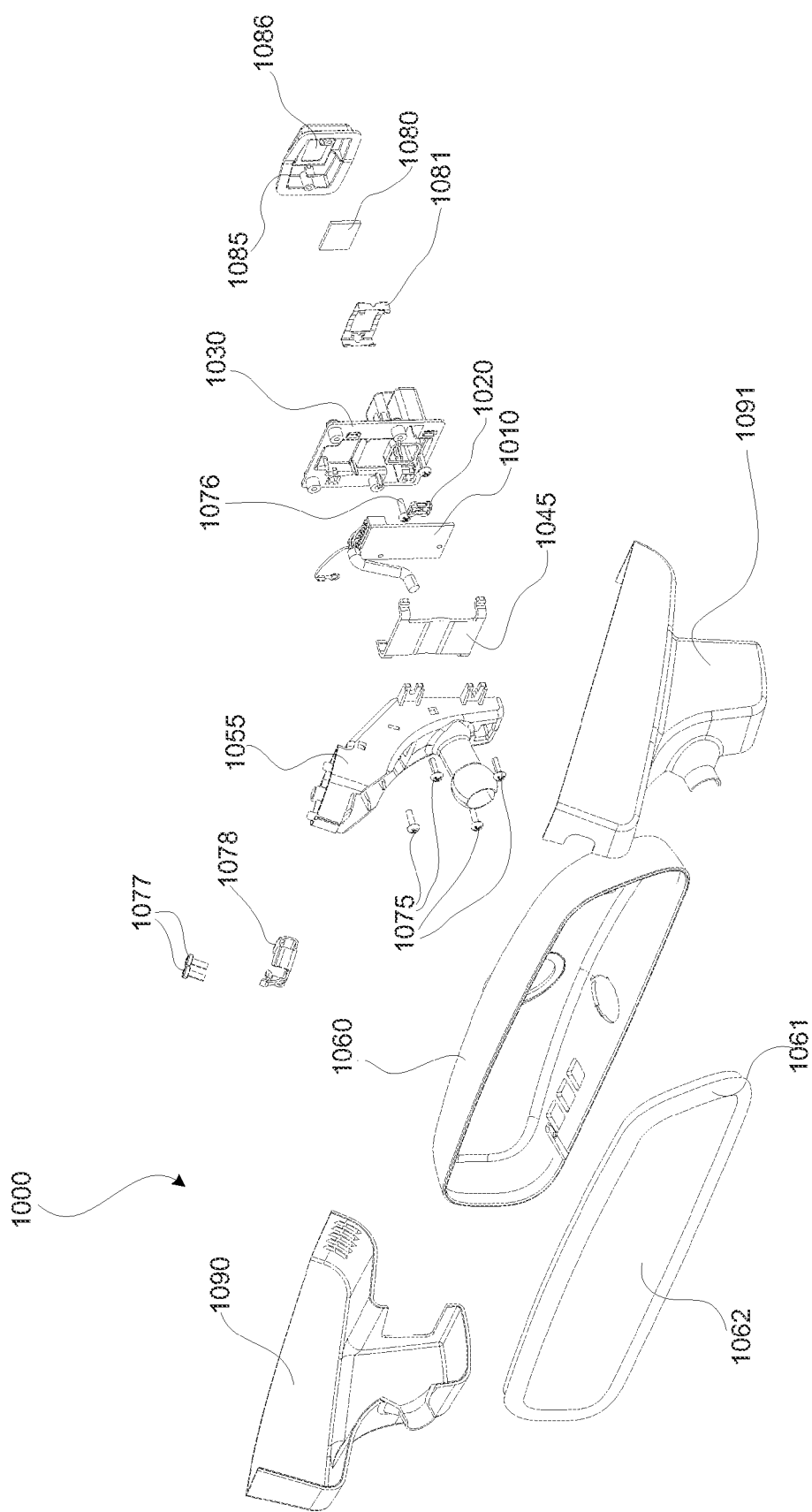
FIG. 10 depicts a second perspective view of the mirror assembly of FIG. 9.

Turning now to FIGS. 9 and 10, there are shown exploded, perspective, views of a rearview mirror assembly 900, 1000. In a preferred embodiment, the rearview mirror assembly provides a rigid structure for mounting an interior rearview mirror along with an imager board. As will be described herein, the preferred accessory and rearview mirror mount assembly facilitates ease of assembly as well as provides for repeatable, reliable and precise alignment of the related components. In at least one embodiment, the associated imager is used for automatic exterior vehicle light control for which precision alignment of the imager is preferred.

Imager board 910, 1010 is provided with an image sensor with lens. In a preferred embodiment, the imager board will also include an image sensor control logic and timing circuit, communication line drivers and wire harness receptacle 913. Optionally, the imager board may comprise a processor for receiving and, at least partially, processing images obtained from the image sensor. In a preferred embodiment, the image sensor and at least one other device selected from the group comprising; 1) an image sensor control logic; 2) an A/D converter; 3) a low voltage differential signal line driver; 4) a temperature sensor; 5) a control output; 6) a voltage regulator; 7) a second image sensor; 8) a microprocessor; 9) a moisture sensor and 10) a compass are integrated in a common ASIC, most preferably on a common silicon wafer. Preferably, the image sensor with lens includes lens cover snap portions for engaging lens cover 920, 1020 snap clips. The lens cover has an aperture for alignment with the image sensor and lens.

An imager board wiring harness (not shown) is preferably provided with plugs on either end thereof. The imager board is preferably provided with a male receptacle 913 for receiving one of the plugs of the imager board wiring harness.

In a preferred assembly method, an imager board and an imager board wiring harness are provided and the wiring harness is plugged into the associated receptacle 913. The lens cover is snapped onto the lens and the imager board is placed on the carrier/baffle such that alignment pins are received within alignment holes such that the imager with lens and lens cover are aligned with the baffle aperture. Preferably, the alignment pins and, or, holes are slightly tapered such that the pins are initially freely received within the alignment holes then become snug once the imager board is pressed into place upon the carrier/baffle. Preferably, the lens cover is further secured in place by the lens cover retainers. It should be understood that the baffle may be a separate part that snaps in place on a separate carrier.

Once the imager board is in place upon the carrier/baffle, the imager board retainer 945, 1045 is placed such that the imager board and compass sensor board are retained upon the carrier/baffle. Preferably, the imager board retainer comprises hinge portions that are received within the hinge receptacles with the imager board retainer substantially perpendicular to the carrier/baffle. The imager board retainer is preferably then pivoted around the hinge portions such that the clip portions are received within clip receptacles and retained therein via interlocking clips. It should be understood that the imager board retainer may be configured to snap in place at four points in lieu of the hinge portions on one end.

A far field baffle is preferably snapped onto the carrier/baffle such that the aperture is aligned with the baffle aperture and such that the far field baffle snap clips are engaged with far field snap portions on either side of the baffle. The far field baffle, in part, defines the field of view of the associated image sensor.

The carrier/baffle 930, 1030 is placed proximate the attachment member 955, 1055 such that the registration portions are received within registration receptacles. Once the carrier/baffle is aligned with the attachment member the four fasteners 975, 1075 are placed through fastener slots 957, 1057 and received within fastener receptacles to secure the carrier/baffle to the attachment member. Preferable, the fasteners are threaded screws and the fastener receptacles are provided with mating threads. Optionally, the fasteners and fastener receptacles may be configured with interference fit functionality such that the fasteners are pressed into the fastener receptacles. It should be understood that the carrier/baffle may be configured to snap onto the attachment member in lieu of using fasteners.

The transparent cover 980, 1080 is attached to the front housing 985, 1085 such that the transparent cover is fixed to the front housing to close the aperture 986, 1086. The transparent cover may be assembled with a spring clip 981 using housing interlocks (shown as elements 1581*a*, 1581*b* in FIG. 15) and spring clip interlocks (shown as elements 1589*a*, 1589*b* in FIG. 15). Preferably, the transparent cover is substantially transparent to light rays in the visible spectrum, however, incorporates an infrared and, or, ultra violet spectral filter characteristic. Thereby, substantially blocking infrared and, or, ultra violet light rays from impinging upon the image sensor. Front housing 985, 1085 is preferable provided with a recessed periphery with a snap interlock to engage an inner perimeter with snap interlock, of rear housing portions 990, 991, 1090, 1091. The front housing and rear housing portions combine to define an enclosure.

Figure 11:
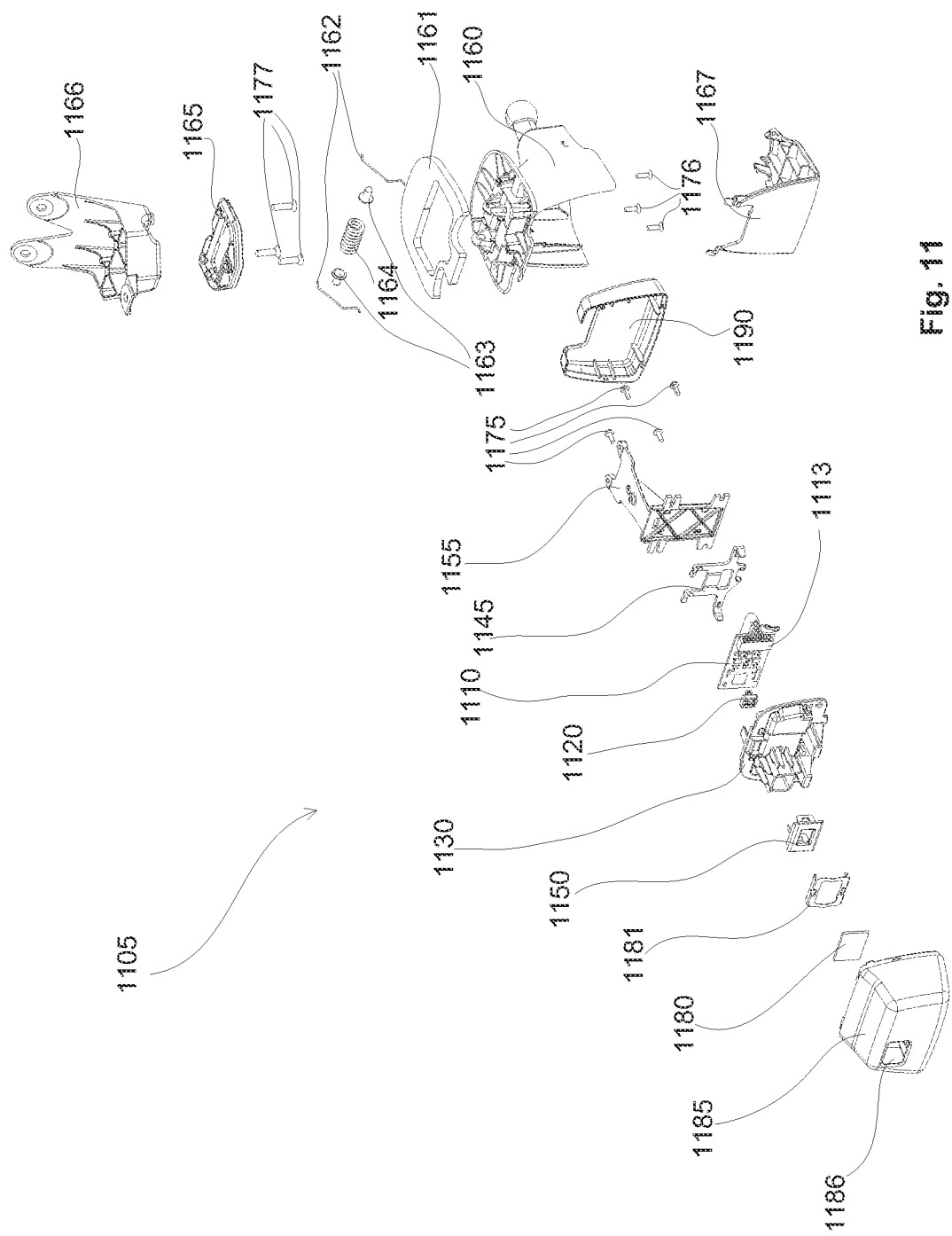
FIG. 11 depicts a perspective view of a second exploded stationary assembly.
Figure 12:
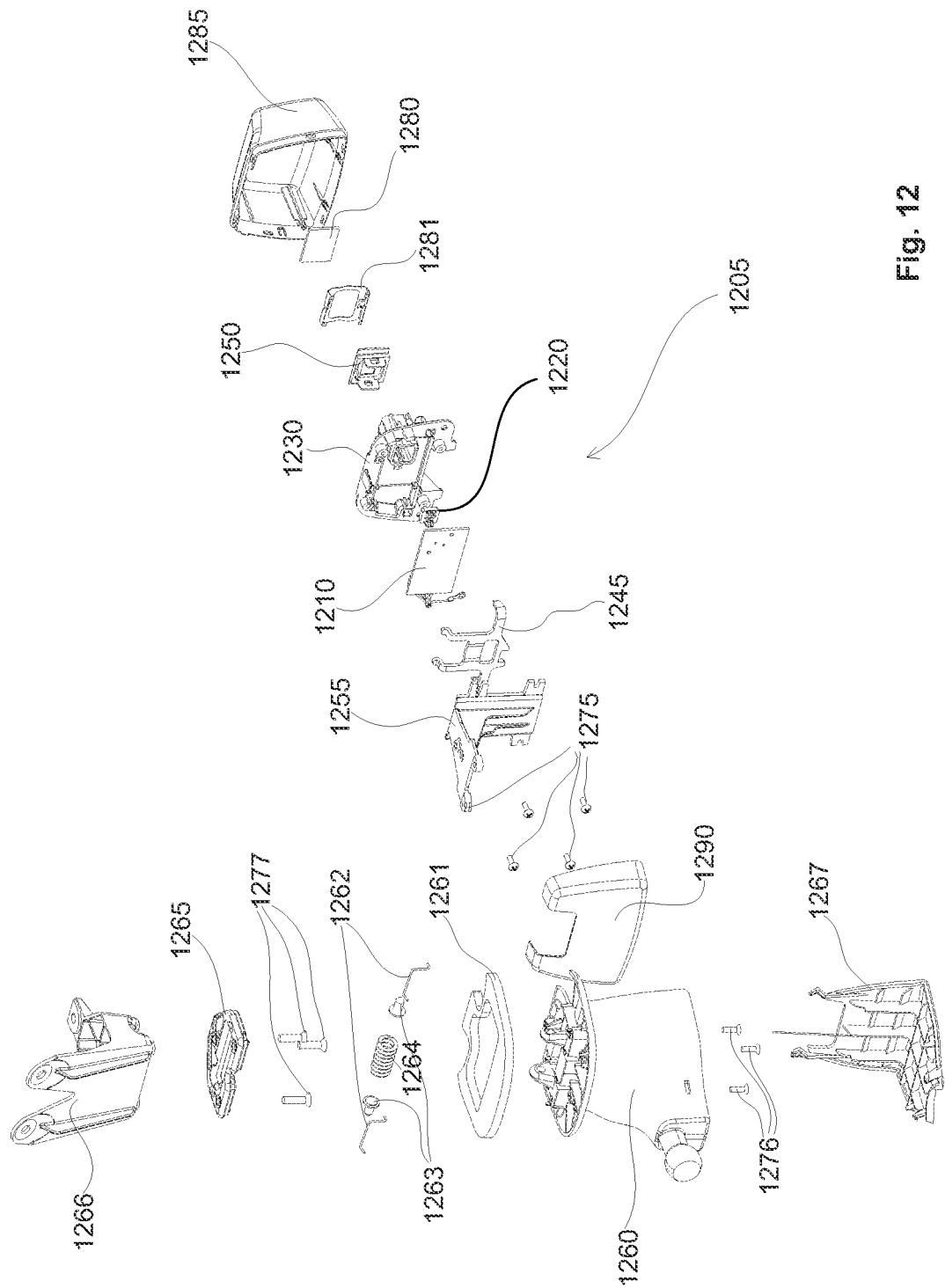
FIG. 12 depicts a second perspective view of the stationary assembly of FIG. 11

Turning now to FIGS. 11 and 12, there are shown exploded, perspective, views of an accessory and rearview mirror mount assembly 1105, 1205. In a preferred embodiment, the accessory and rearview mirror mount assembly provides a rigid structure for mounting an interior rearview mirror along with an imager board. As will be described herein, the preferred accessory and rearview mirror mount assembly facilitates ease of assembly as well as provides for repeatable, reliable and precise alignment of the related components. In at least one embodiment, the associated image sensor is used for automatic vehicle exterior light control for which precision alignment of the image sensor is preferred.

Imager board 1110, 1210 is provided with an image sensor with lens. In a preferred embodiment, the imager board will also include an image sensor control logic and timing circuit, communication line drivers and wire harness receptacle 1113. Optionally, the imager board may comprise a processor for receiving and, at least partially, processing images obtained from the image sensor. In a preferred embodiment, the image sensor and at least one other device selected from the group comprising; 1) an image sensor control logic; 2) an A/D converter; 3) a low voltage differential signal line driver; 4) a temperature sensor; 5) a control output; 6) a voltage regulator; 7) a second image sensor; 8) a microprocessor; 9) a moisture sensor and 10) a compass are integrated in a common ASIC, most preferably on a common silicon wafer. Preferably, the image sensor with lens includes lens cover snap portions for engaging lens cover 1120, 1220 snap clips. The lens cover has an aperture for alignment with the image sensor and lens.

An imager board wiring harness is preferably provided with plugs on either end thereof. The imager board is preferably provided with a male receptacle 1113 for receiving one of the plugs of the imager board wiring harness.

In a preferred assembly method, an imager board and an imager board wiring harness are provided and the wiring harness is plugged into the associated receptacle 1113. The lens cover is snapped onto the lens and then the imager board is placed on the carrier/baffle such that alignment pins are received within alignment holes such that the imager with lens and lens cover are aligned with the baffle aperture. Preferably, the alignment pins and, or, holes are slightly tapered such that the pins are initially freely received within the alignment holes then become snug once the imager board is pressed into place upon the carrier/baffle. Preferably, the lens cover is further secured in place by lens cover retainers. It should be understood that the baffle may be a separate part that snaps in place on a separate carrier.

Once the imager board is in place upon the carrier/baffle, the imager board retainer 1145, 1245 is placed such that the imager board and compass sensor board are retained upon the carrier/baffle. Preferably, the imager board retainer comprises hinge portions that are received within the hinge receptacles with the imager board retainer substantially perpendicular to the carrier/baffle. The imager board retainer is preferably then pivoted around the hinge portions such that the clip portions are received within clip receptacles and retained therein via interlocking clips. It should be understood that the imager board retainer may be configured to snap in place at four points in lieu of the hinge portions on one end.

A far field baffle 1150, 1250 is snapped onto the carrier/baffle such that the aperture is aligned with the baffle aperture and such that the far field baffle snap clips are engaged with far field snap portions on either side of the baffle. The far field baffle, in part, defines the field of view of the associated image sensor.

The carrier/baffle 1130, 1230 is placed proximate the attachment member 1155, 1255 such that the registration portions are received within registration receptacles. Once the carrier/baffle is aligned with the attachment member, the four fasteners 1175, 1275 are placed through fastener slots and received within fastener receptacles to secure the carrier/baffle to the attachment member. Preferable, the fasteners are threaded screws and the fastener receptacles are provided with mating threads. Optionally, the fasteners and fastener receptacles may be configured with interference fit functionality such that the fasteners are pressed into the fastener receptacles. It should be understood that the carrier/baffle may be configured to snap onto the attachment member in lieu of using fasteners.

The transparent cover 1180, 1280 is attached to the front housing 1185, 1285 such that the transparent cover is fixed to the front housing to close the aperture 1186. The transparent cover may be assembled with a spring clip 1181 using housing interlocks (shown as elements 1581*a*, 1581*b* in FIG. 15) and spring clip interlocks (shown as elements 1589*a*, 1589*b* in FIG. 15). Preferably, the transparent cover is substantially transparent to light rays in the visible spectrum, however, incorporates an infrared and, or, ultra violet spectral filter characteristic. Thereby, substantially blocking infrared and, or, ultra violet light rays from impinging upon the image sensor. Front housing 1185, 1285 is preferable provided with a recessed periphery with snap interlock to engage an inner perimeter with snap interlock, of a rear housing. The front housing and rear housing 1190, 1290 combine to define an enclosure.

The accessory and rearview mirror mount assembly 1105, 1205 embodiment depicted in FIGS. 11, and 12 is configured to mount to an overhead console area of a controlled vehicle in lieu of being configured to mount on a windshield button. The embodiment of FIGS. 11 and 12 comprises a mount 1160, a gasket 1161, trigger wires 1162, mounting pins 1163, compression spring 1164, a detach plate 1165, an extension bracket 1166 and detach plate fasteners 1177 that cooperate to mount the accessory and rearview mirror mount assembly to the overhead console area.

Figure 13:
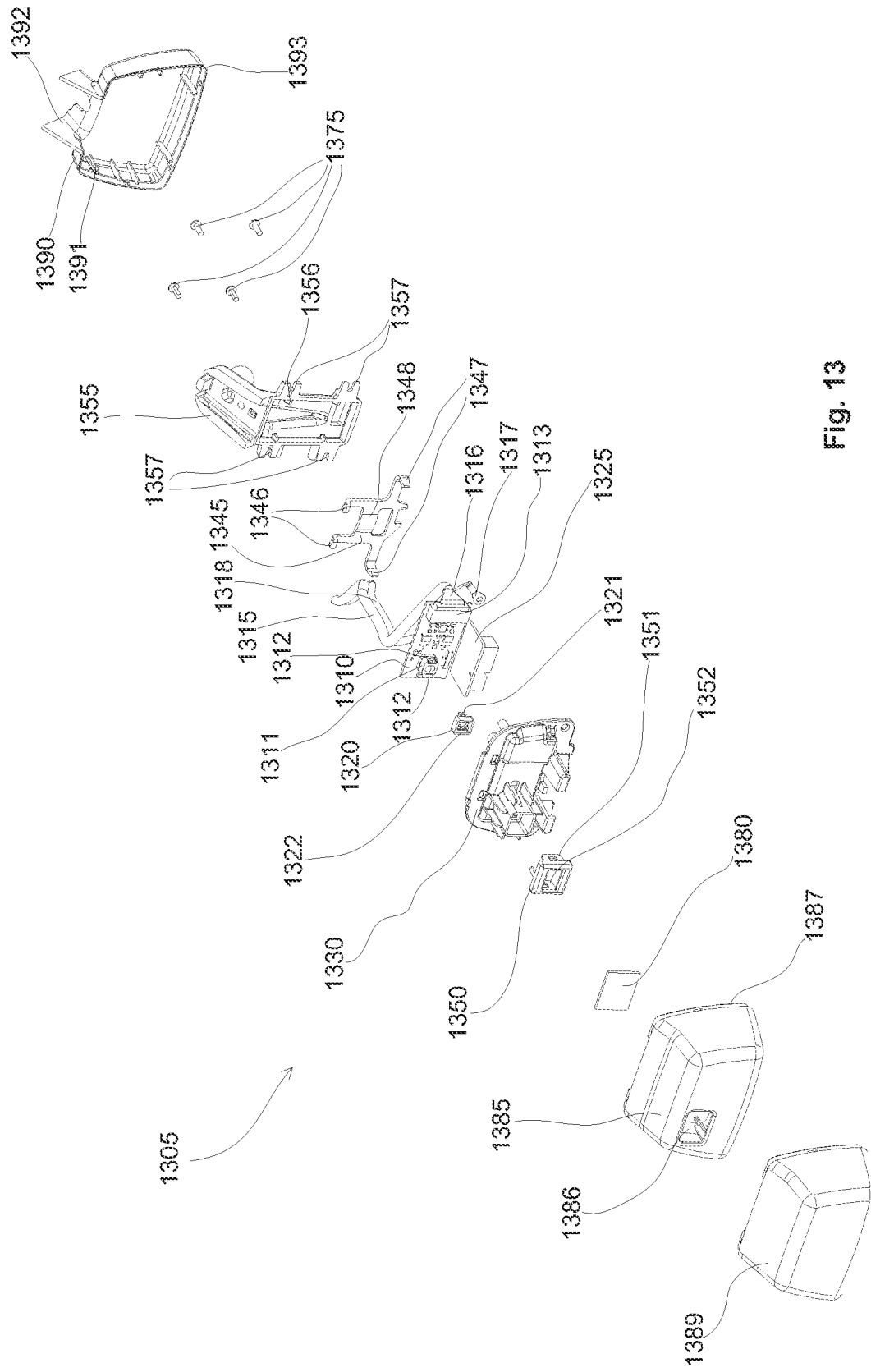
FIG. 13 depicts a perspective view of a third exploded stationary assembly.
Figure 14:
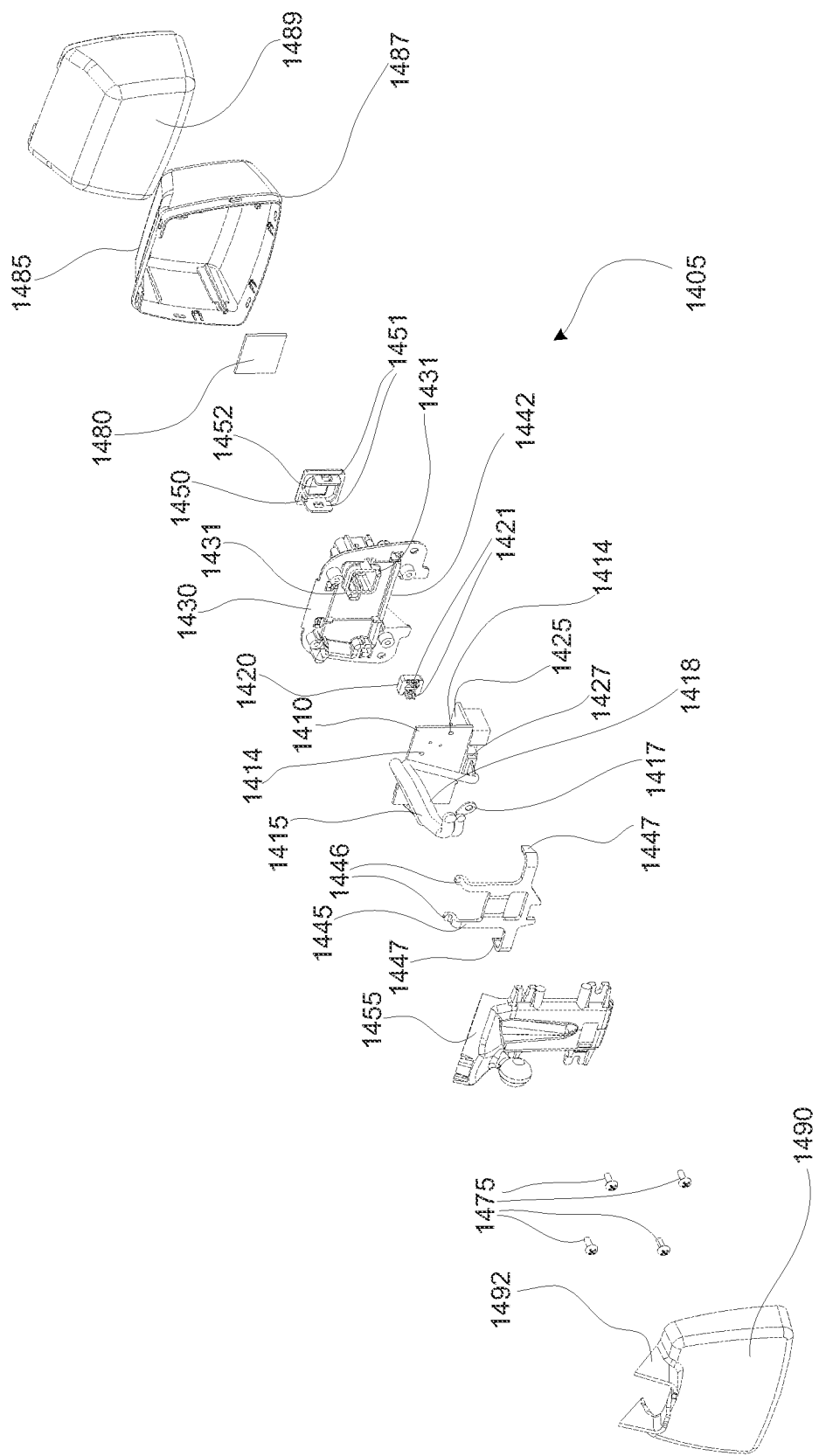
FIG. 14 depicts a second perspective view of the stationary assembly of FIG. 13.

Turning now to FIGS. 13 and 14, there are shown exploded, perspective, views of an accessory and rearview mirror mount assembly 1305, 1405. In a preferred embodiment, the accessory and rearview mirror mount assembly provides a rigid structure for mounting an interior rearview mirror along with an imager board and a compass board. As will be described herein, the preferred accessory and rearview mirror mount assembly facilitates ease of assembly as well as provides for reliable, precise, alignment of the related components. In at least one embodiment, the associated imager is used for automatic exterior vehicle light control for which precision alignment of the imager is preferred.

Imager board 1310, 1410 is provided with an image sensor with lens 1311. In a preferred embodiment, the imager board will also include an image sensor control logic and timing circuit, communication line drivers and wire harness receptacle 1313. Optionally, the imager board may comprise a processor for receiving and, at least partially, processing images obtained from the image sensor. In a preferred embodiment, the image sensor and at least one other device selected from the group comprising; 1) an image sensor control logic; 2) an A/D converter; 3) a low voltage differential signal line driver; 4) a temperature sensor; 5) a control output; 6) a voltage regulator; 7) a second image sensor; 8) a microprocessor; 9) a moisture sensor and 10) a compass are integrated in a common ASIC, most preferably on a common silicon wafer. Preferably, the image sensor with lens 1311 includes lens cover snap portions 1312 for engaging lens cover 1320, 1420 snap clips 1321. The lens cover has an aperture 1322 for alignment with the image sensor and lens.

Imager board wiring harness 1315, 1415 is preferably provided with plugs 1316 on either end thereof. In a preferred embodiment, the imager board wiring harness comprises nine pin plugs and receptacles with all nine pins aligned in a common plane. The imager board wiring harness preferably comprises seven similarly sized individually insulated conductors bundled together with a larger insulated ground conductor spirally wound around the seven conductors with a shielded outer jacket placed over the seven conductors and the ground wire. Preferably, the seven wires are all terminated within an associated plug, on the end opposite the imager board receptacle end, with a grounded connection on pins 1 and 6, a positive data clock connection on pin 2, a negative data clock on pin 3, an unregulated positive 12 volt connection on pin 4, an unregulated 12 volt reference connection on pin 5, positive data connection on pin 7 and a negative data connection on pin 8. Preferably, the imager board receptacle end of the imager board wiring harness is identical to the opposite end except for the fact that the larger insulated ground wire is not terminated in the plug, it is instead terminated with a ground connector 1317, 1417.

As shown in FIG. 14, a compass sensor board 1325, 1425 is provided with a compass wiring harness 1426 with plug/receptacle 1427. In a preferred embodiment, the compass wiring harness 1426 is provided with a plug on both ends. In a preferred embodiment, the compass wiring harness comprises four similarly sized, individually insulated, conductors with a jacket surrounding the bundled conductors. Preferably, all four conductors are terminated in a plug on either end.

In a preferred assembly method, a compass sensor board and a compass board wiring harness are provided and the wiring harness is plugged into the associated receptacle. An imager board and an imager board wiring harness are provided and the wiring harness is plugged into the associated receptacle. The compass sensor board is then placed within compass board receptacle 1442 of the carrier/baffle 1330, 1430. The lens cover is snapped onto the lens and then the imager board is placed on the carrier/baffle such that the alignment pins 1431 are received within the alignment holes 1414 such that the imager with lens and lens cover are aligned with the baffle aperture. Preferably, the alignment pins and, or, holes are slightly tapered such that they are initially freely received within the alignment holes then become snug once the imager board is pressed into place upon the carrier/baffle. Preferably, the lens cover is further secured in place by the lens cover retainers. It should be understood that the baffle may be a separate part that snaps in place on a separate carrier.

Once the compass sensor board and imager board are in place upon the carrier/baffle, the imager board retainer 1345, 1445 is placed such that the imager board and compass sensor board are retained upon the carrier/baffle. Preferably, the imager board retainer comprises hinge portions 1346, 1446 that are received within the hinge receptacles 834 with the imager board retainer substantially perpendicular to the carrier/baffle. The imager board retainer is preferably then pivoted around the hinge portions such that the clip portions 1347, 1447 are received within clip receptacles and retained therein via interlocking clips. It should be understood that the imager board retainer may be configured to snap in place at four points in lieu of the hinge portions on one end.

A far field baffle 1350, 1450 is snapped onto the carrier/baffle such that the aperture 1352, 1452 is aligned with the baffle aperture and such that the far field baffle snap clips 1351, 1451 are engaged with far field snap portions on either side of the baffle. The far field baffle, in part, defines the field of view of the associated image sensor.

The carrier/baffle 1330, 1430 is placed proximate the attachment member 1355, 1455 such that the registration portions are received within the registration receptacles 1356, 1456. Once the carrier/baffle is aligned with the attachment member and the compass board wiring harness is threaded through the lower aperture the four fasteners 1375, 1475 are placed through fastener slots 1357, 1457 and received within fastener receptacles to secure the carrier/baffle to the attachment member. Preferable, the fasteners are threaded screws and the fastener receptacles are provided with mating threads. Optionally, the fasteners and fastener receptacles may be configured with interference fit functionality such that the fasteners are pressed into the fastener receptacles. It should be understood that the carrier/baffle may be configured to snap onto the attachment member in lieu of using fasteners.

The transparent cover 1380, 1480 is attached to the front housing 1385, 1485 such that the transparent cover is fixed to the front housing to close the aperture 1386. Preferable, the transparent cover is fixed to the front cover with heat staking and/or adhesive. Alternately, the transparent cover may be integrally molded with the front housing, assembled with spring clips or use of an elastic boot. Preferably, the transparent cover is substantially transparent to light rays in the visible spectrum, however, incorporates an infrared and, or, ultra violet spectral filter characteristic. Thereby, substantially blocking infrared and, or, ultra violet light rays from impinging upon the image sensor. Front housing 1385, 1485 is preferable provided with a recessed periphery with snap interlock 1387, 1487 to engage an inner perimeter with snap interlock 1393, of a rear housing 1390, 1490. The front housing and rear housing combine to define an enclosure.

Figure 15:
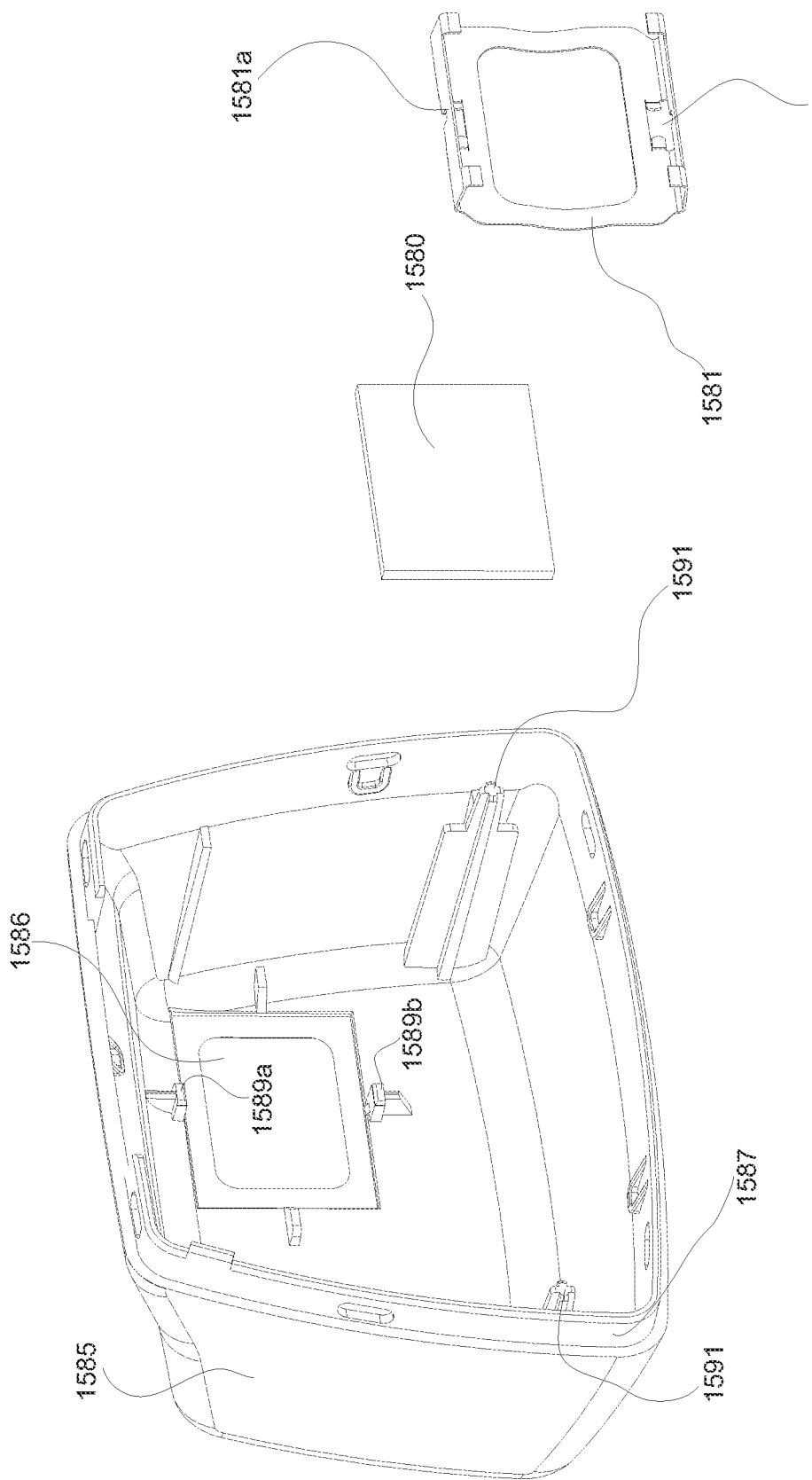
FIG. 15 depicts a perspective view of an exploded front housing.

Turning now to FIG. 15, there is shown a front housing 1585 having an aperture 1586, a recessed periphery with snap interlock 1587, part match pins 1591 and spring clip interlocks 1589a, 1589b. A transparent cover 1580 is retained in a desire position proximate the front housing aperture via a spring clip 1581. The spring clip has housing interlocks 1581a, 1581b for receiving the spring clip interlocks 1589a, 1589b, respectively. Preferably, the spring clip is bowed slightly to improve the transparent cover retention abilities.

Figure 16A:
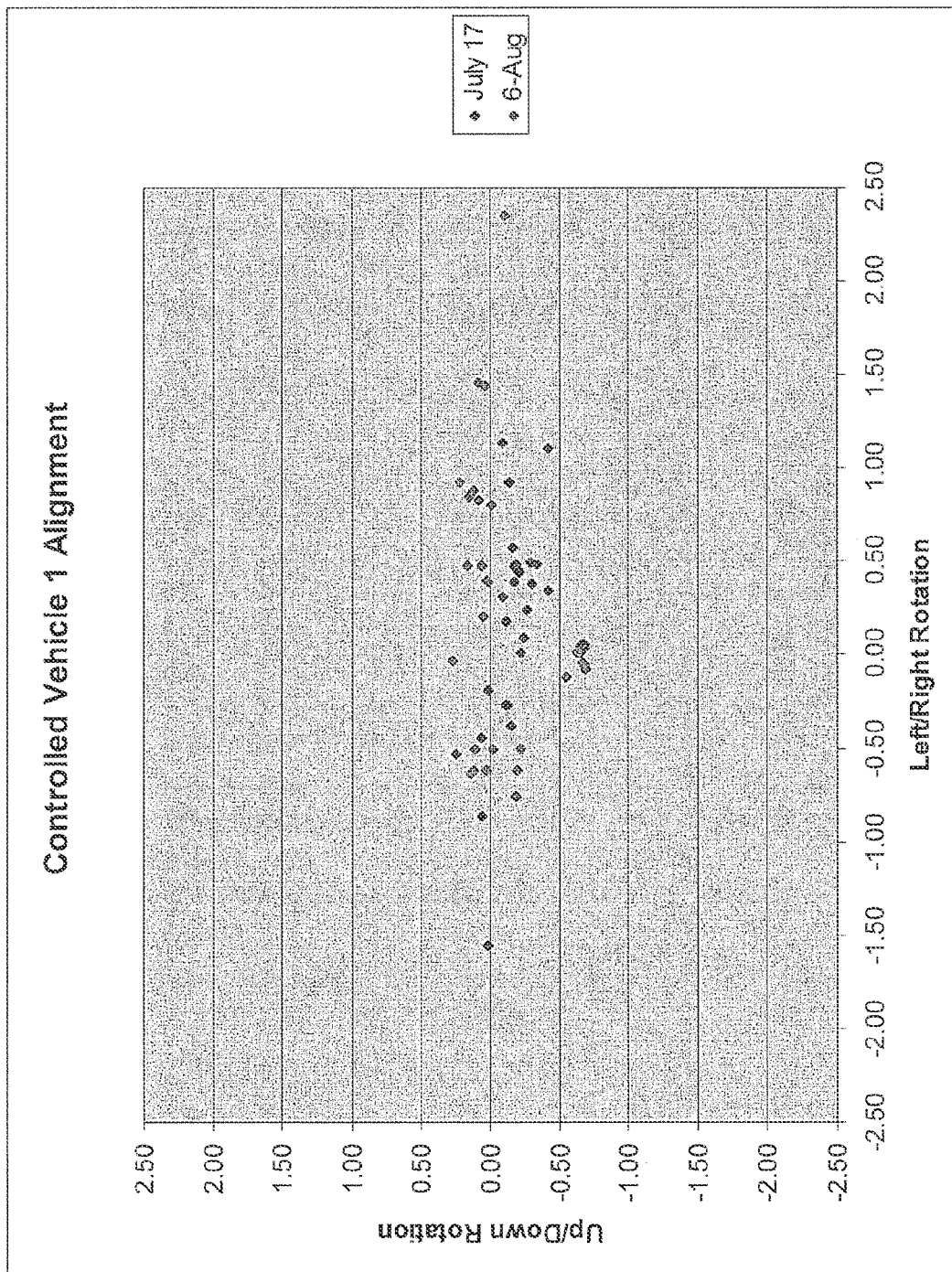
FIGS. 16a and 16b depict actual image sensor alignment values.
Figure 16B:
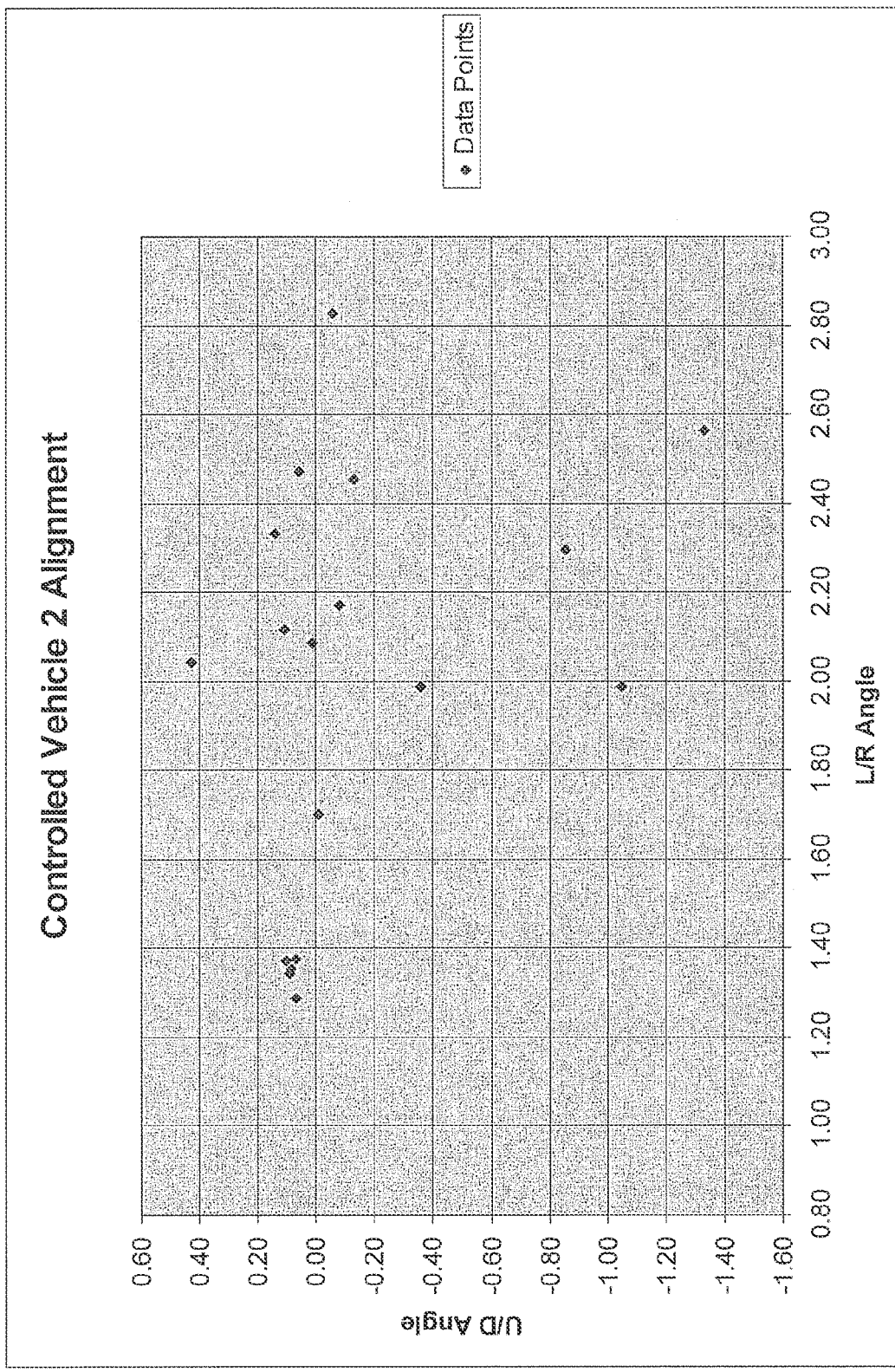

FIGS. 16a and 16b depict actual results of data relating to the alignment aim of image sensors installed in two different controlled vehicle types. The variations shown are for vehicles of the same type compared to one another. It is preferably to maintain an overall sensor field of view within a +/−2.5 degree range from a nominal design value.

Figure 17:
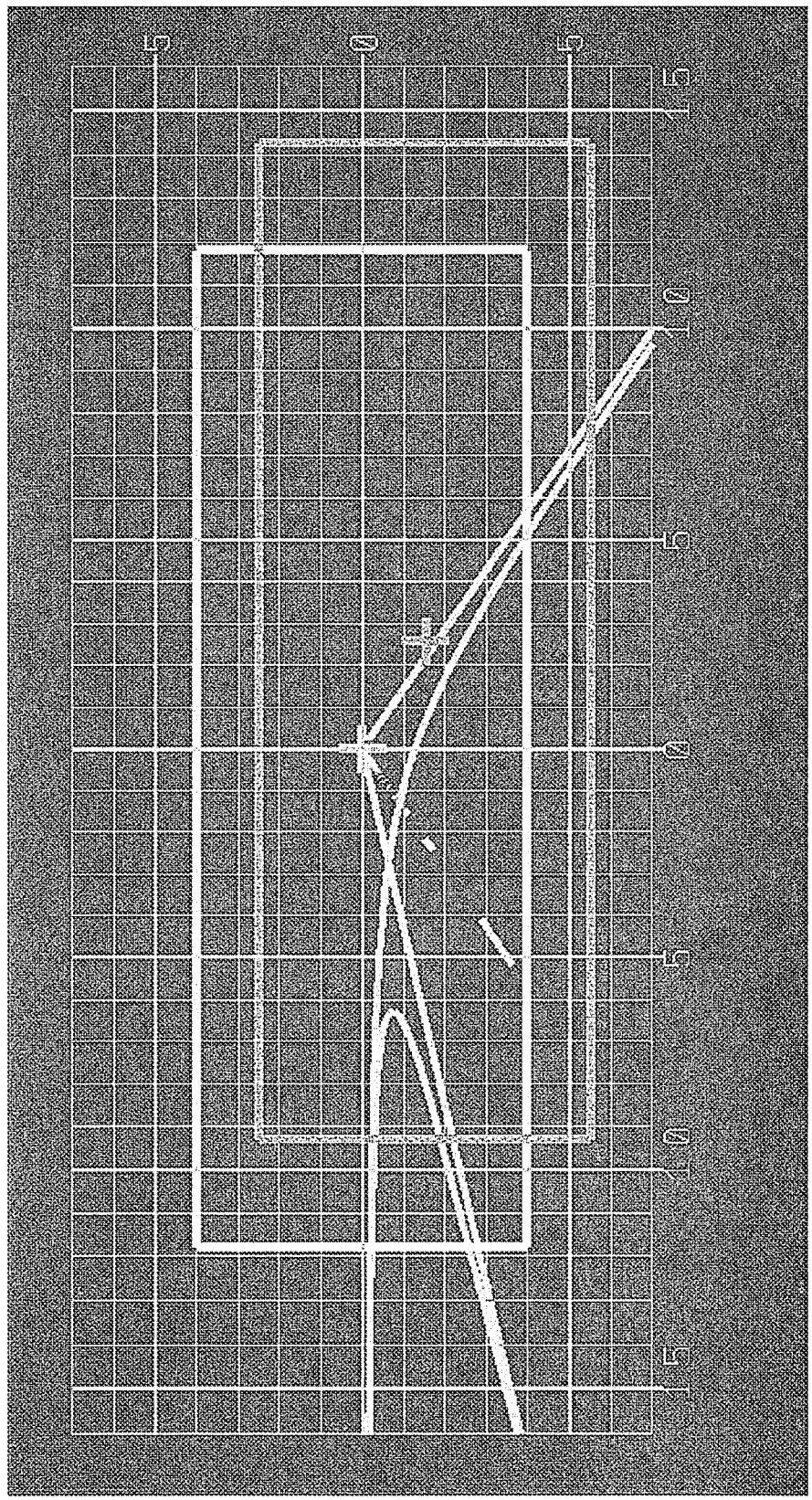
FIG. 17 depicts image sensor field of view versus alignment.

Turning now to FIGS. 17 through 21, automatic vehicle exterior light control system is discussed with respect to image sensor alignment. Some performance effects associated with image sensor alignment are image sensor optical axis shifts from centroid of light distribution, image sensor field of view limited horizontally and image sensor field of view limited vertically. FIG. 17 depicts how the field of view differs with respect to image sensor alignment.

Figure 18:
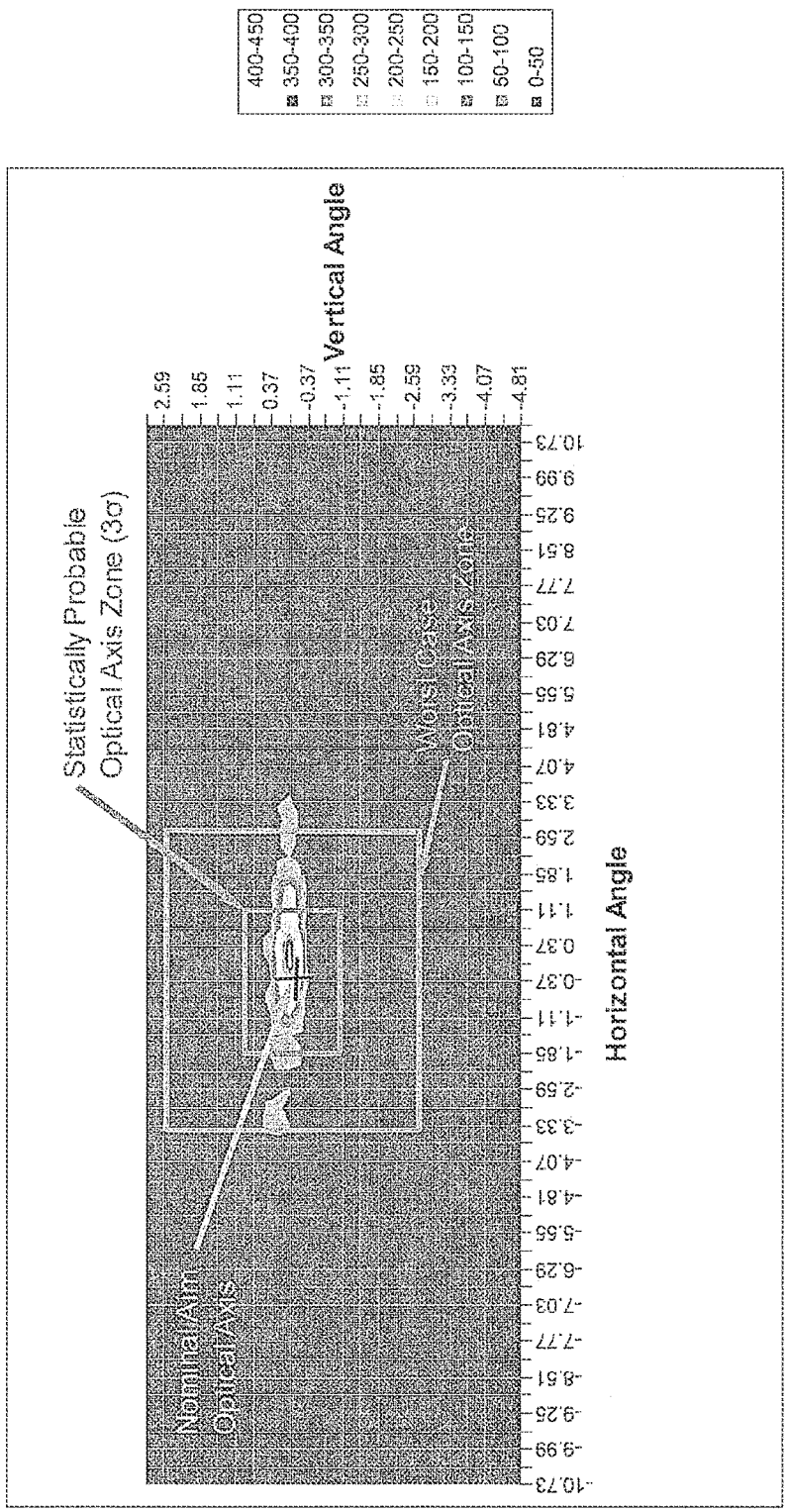
FIG. 18 depicts actual taillight count versus image position.
Figure 19:
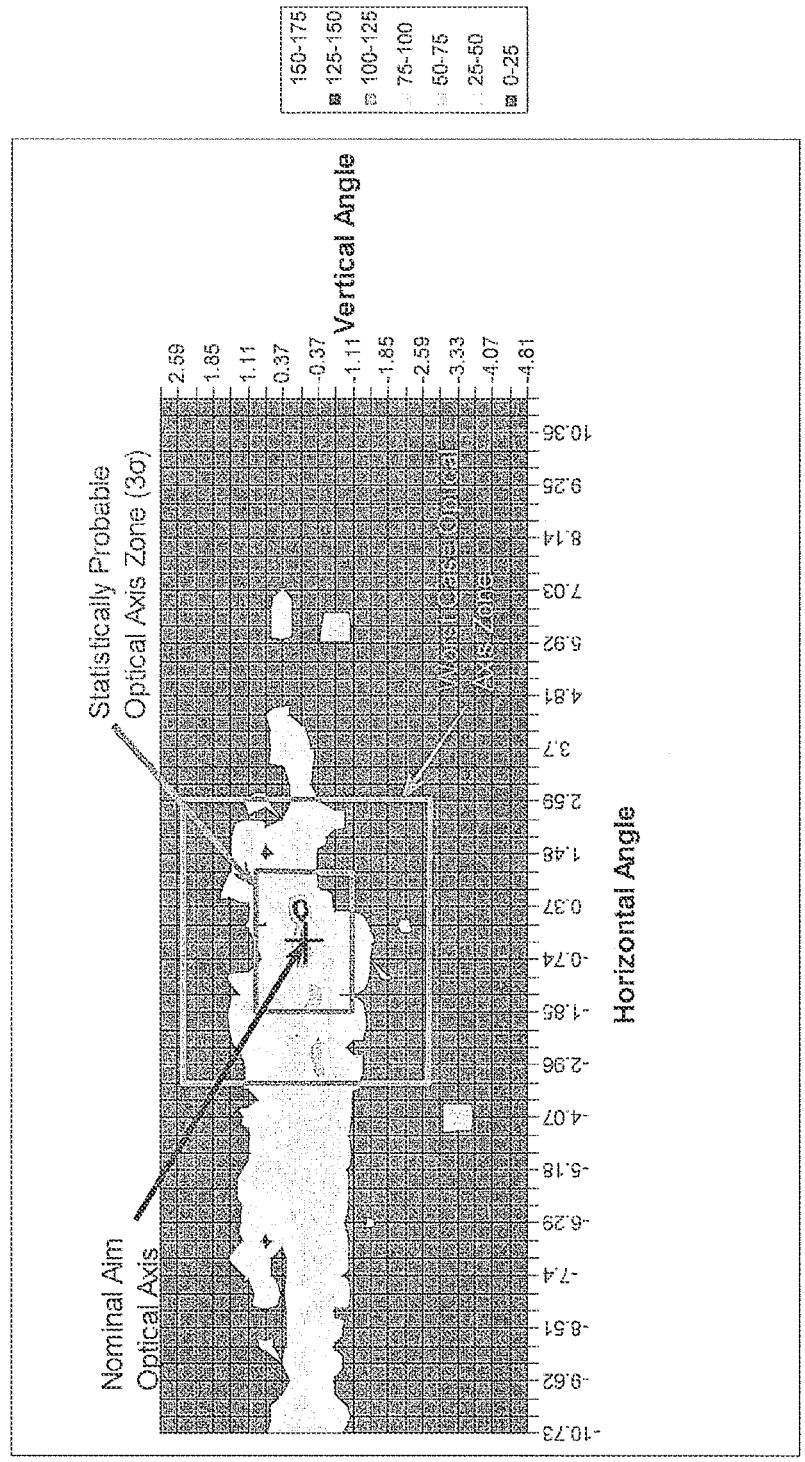
FIG. 19 depicts actual headlamp count versus image position.

FIG. 18 depicts a summary of data relating to detected taillights of leading vehicles during actual operation of an embodiment of the present invention. FIG. 19 depicts a summary of data relating to detected headlights of oncoming vehicles during actual operation of an embodiment of the present invention.

Automatic vehicle exterior light control system performance may be affected by shifts in the image sensor optical axis. When misalignment is present, often even the most frequently encountered light sources will not be focused in the correct pixel zones expected by the corresponding image analysis algorithms. Algorithms to self calibrate the alignment of the image sensor with the longitudinal axis of the vehicle may be provided to correct for minor misalignment when pixels around the perimeter of the imager are so configured. It should be understood that a mechanical image sensor repositioning means may be provided that allows either automatic and, or, manual image sensor alignment. The automatic means may comprise inputs from other controlled vehicle equipment such as pitch sensors, yaw sensors, turning sensors, breaking sensors, acceleration sensors, load sensors, etc. In plant calibration and, or, dynamic calibration means may be provided.

Figure 20:
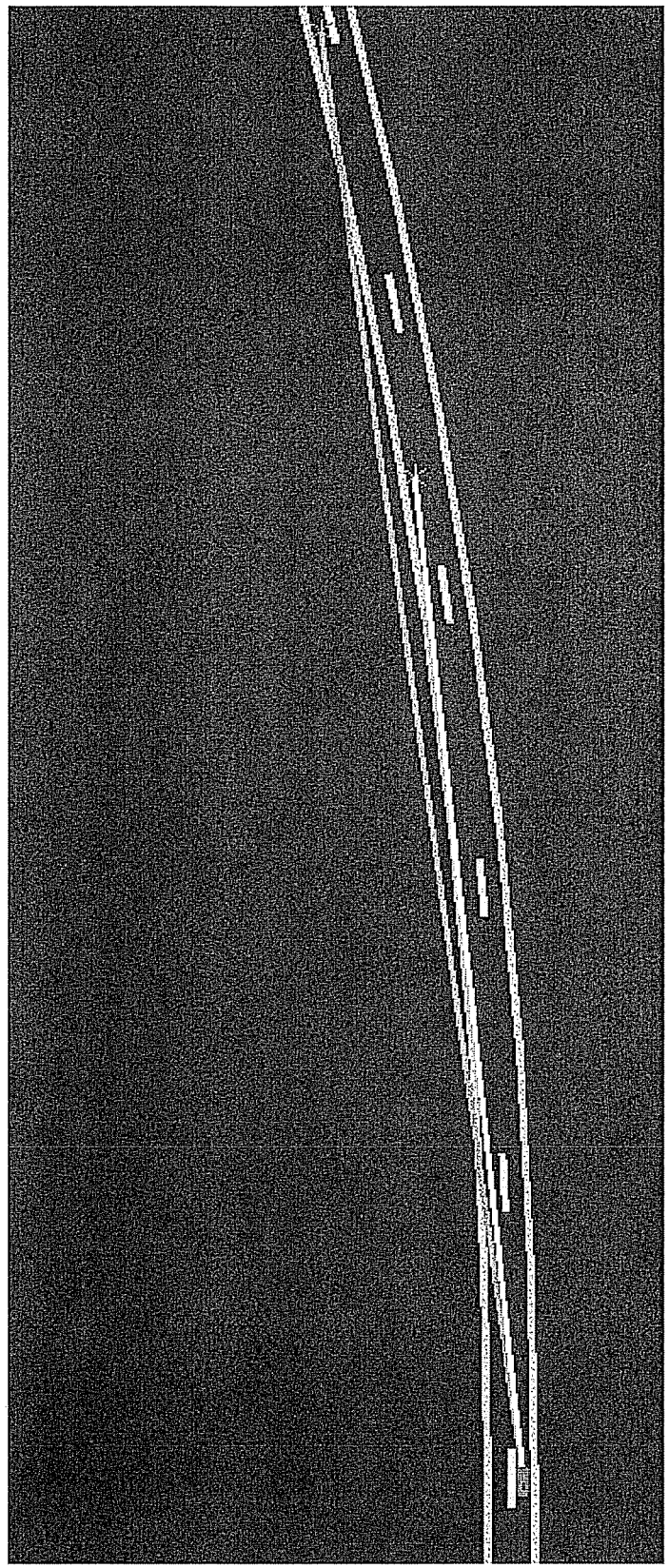
FIG. 20 is a pictorial representation of the data of Table 5.
Figure 21:
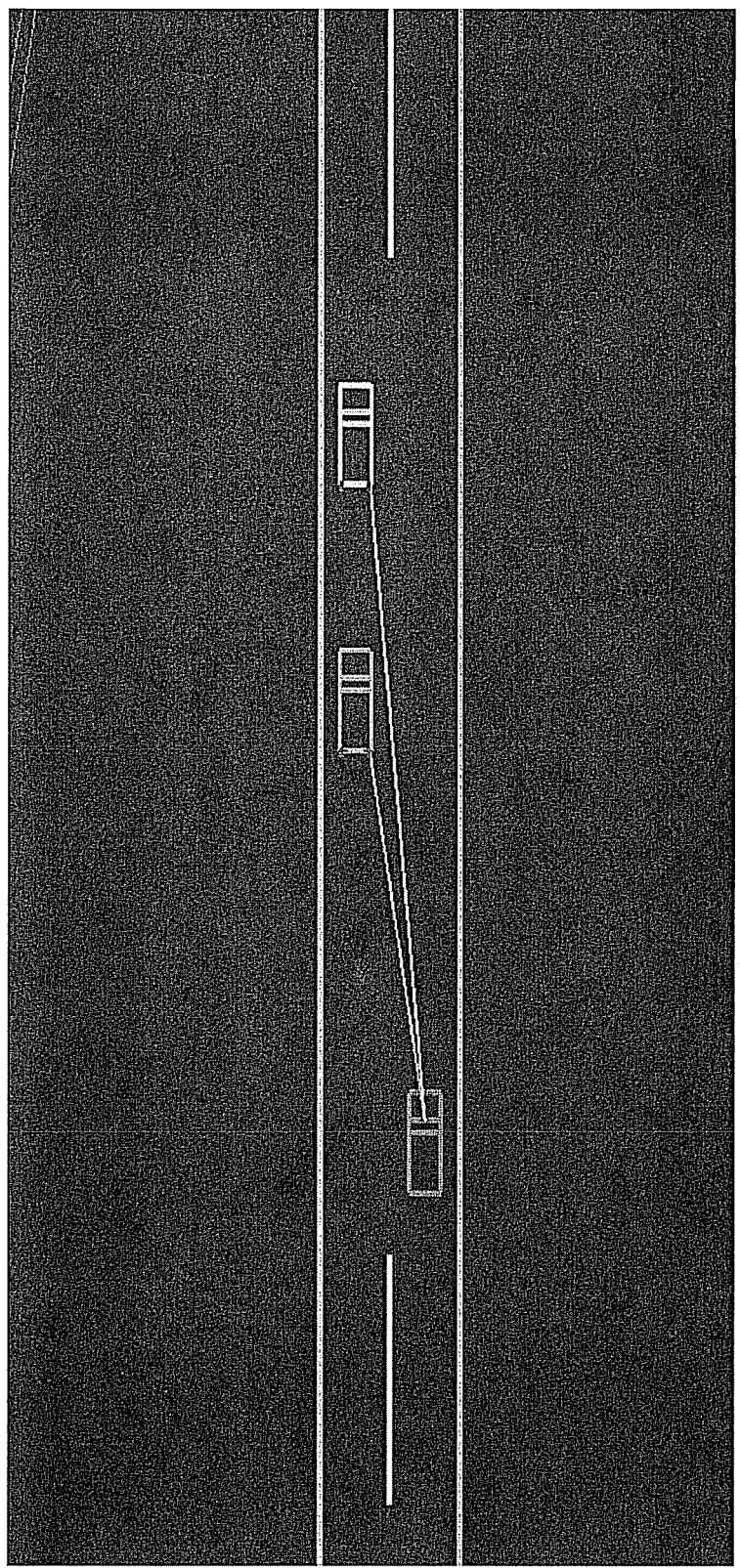
FIG. 21 is a pictorial representation of the data of Table 6.

Automatic vehicle exterior light control system performance may be impacted when the field of view of the image sensor is limited horizontally. When misalignment is present reduced curve performance often is experienced, high beam headlight glare to passing vehicles is often experienced and high beam headlights often return to full brightness and, or, incorrect aim before an on-coming car is past. Table 5 and 6 and FIGS. 20 and 21 depict the effects of limiting the horizontal view of an image sensor in an automatic vehicle exterior light control system.

TABLE 5

Curved Road Performance in Feet - Detection Distance

|  | No Rotation | 0.75 Deg Rot | 1.50 Deg Rot | 3.0 Deg Rot | 5.0 Deg Rot |
|---|---|---|---|---|---|
| 1640 ft Radius Curve (500 m) | 530 | 484 | 436 | 326 |  |
| 3280 ft Radius Curve (1000 m) | 1148 | 1066 | 982 | 810 | 558 |
| 4921 ft Radius Curve (1500 m) | 1758 | 1637 | 1516 | 1271 | 927 |

TABLE 6

Straight Road Performance

|  | No Rotation | 0.75 Deg Rot | 1.5 Deg Rot | 3 Deg Rot | 5 Deg Rot | Comments |
|---|---|---|---|---|---|---|
| Distance to FOV Limit (feet) | 54.02 | 58.80 | 61.96 | 70.59 | 87.29 | Assume standard two lane road 4 m wide |
| Overtaken by 5 mph | 7.37 | 8.02 | 8.45 | 9.63 | 11.9 | Seconds to detect passing vehicle |
| Overtaken by 10 mph | 3.68 | 4.01 | 4.22 | 4.81 | 5.95 | Seconds to detect passing vehicle |
| Overtaken by 15 mph | 2.46 | 2.67 | 2.82 | 3.21 | 3.97 | Seconds to detect passing vehicle |
| On-coming - 25 mph | 0.74 | 0.8 | 0.84 | 0.96 | 1.19 | Seconds from loss of detection until vehicle passes |
| On-coming - 35 mph | 0.53 | 0.57 | 0.6 | 0.69 | 0.85 | Seconds from loss of detection until vehicle passes |
| On-coming - 45 mph | 0.41 | 0.45 | 0.47 | 0.53 | 0.66 | Seconds from loss of detection until vehicle passes |
| On-coming - 55 mph | 0.33 | 0.36 | 0.38 | 0.44 | 0.54 | Seconds from loss of detection until vehicle passes |
| On-coming - 65 mph | 0.28 | 0.31 | 0.33 | 0.37 | 0.46 | Seconds from loss of detection until vehicle passes |

Automatic vehicle exterior light control system performance may be affected by limiting the image sensor vertical field of view. Reduced hill performance is often experienced. It is difficult to quantify loss in performance because headlamp light output varies greatly through vertical angles.

The above description is considered that of the preferred embodiments only. Modifications of the invention will occur to those skilled in the art and to those who make or use the invention. Therefore, it is understood that the embodiments shown in the drawings and described above are merely for illustrative purposes and not intended to limit the scope of the invention, which is defined by the following claims as interpreted according to the principles of patent law, including the doctrine of equivalents.

What is claimed is:

1. An imager assembly for use in a vehicle, comprising: an attachment member and one of a carrier and a baffle configured to secure an imager board, said imager board having an image sensor with an image sensor optical axis that intersects said imager board and is substantially orthogonal to said imager board, wherein said image sensor optical axis is within approximately 5 degrees and approximately −5 degrees of a desired image sensor optical axis based on an angular displacement of said imager board about an axis that is orthogonal to said desired image sensor optical axis.

2. The imager assembly of claim 1, wherein said imager assembly incorporates a control system configured to self calibrate an image area of an image sensor to compensate for minor image sensor misalignment.

3. The imager assembly of claim 1, wherein angular displacement of said imager board about said axis changes one of yaw and a pitch of a field of view of said image sensor.

4. The imager assembly of claim 1, said attachment member further comprising a ball for attachment of a rearview mirror assembly.

5. The imager assembly as in claim 1, wherein said image sensor and at least one other device selected from the group comprising: an image sensor control logic; an A/D converter; a low voltage differential signal line driver; a temperature sensor; control output; a voltage regulator; a second image sensor; a microprocessor; a moisture sensor; and a compass are integrated in a common application specific integrated chip.

6. The imager assembly of claim 5, wherein said image sensor and said at least one other device are integrated on a common silicon wafer.

7. An imager assembly for use in a vehicle, comprising: an attachment member and a carrier that secure an imager board having an image sensor, wherein said attachment member and said carrier cooperate to define a first image sensor optical axis that intersects said imager board and is substantially orthogonal to said imager board, wherein said first image sensor optical axis is within approximately 5 degrees and approximately −5 degrees of a desired image sensor optical axis based on an angular displacement of said imager board about an axis that is orthogonal to said desired image sensor optical axis; and at least one shim positioned at least partially between said attachment member and said carrier to define a second image sensor optical axis.

8. The imager assembly of claim 7, said image sensor comprising peripheral pixels that surround pixels associated with a nominal field of view.

9. The imager assembly of claim 8, further comprising automatic alignment means to compensate for minor image sensor optical axis misalignment.

10. The imager assembly of claim 7, said attachment member further comprising a ball for attachment of a rearview mirror assembly.

11. The imager assembly of claim 7, wherein said image sensor and at least one other device selected from the group comprising: an image sensor control logic; an A/D converter; a low voltage differential signal line driver; a temperature sensor; control output; a voltage regulator; a second image sensor; a microprocessor; a moisture sensor; and a compass are integrated in a common application specific integrated chip.

12. An imager assembly for use in a vehicle, comprising: an attachment member and a carrier configured to secure an imager board having an image sensor, wherein said attachment member and said carrier cooperate to define an image sensor optical axis of said image sensor that intersects said imager board and is substantially orthogonal to said image sensor optical axis, wherein said images sensor optical axis is within approximately 5 degrees and approximately −5 degrees of a desired image sensor optical axis based on an angular displacement of said imager board about an axis that is orthogonal to said desired image sensor optical axis; and a mechanical image sensor repositioning means that allows at least one of an automatic image sensor alignment and a manual image sensor alignment.

13. The imager assembly of claim 12, wherein said image sensor and at least one other device selected from the group comprising: an image sensor control logic; an A/D converter; a low voltage differential signal line driver; a temperature sensor; control output; a voltage regulator; a second image sensor; a microprocessor; a moisture sensor; and a compass are integrated in a common application specific integrated chip.

14. The imager assembly of claim 13, further comprising at least one shim positioned at least partially between said attachment member and said carrier to define a second image sensor optical axis.

15. An imager assembly for use in a vehicle, comprising: an attachment member and a carrier configured to secure an imager board having an image sensor with an image sensor optical axis that intersects said imager board and is substantially orthogonal to said imager board, wherein said attachment member an said carrier cooperate to define said image sensor optical axis and said image sensor optical axis is within approximately 5 degrees and approximately −5 degrees of a desired image sensor optical axis based on an angular displacement of said imager board about an axis that is orthogonal to said desired image sensor optical axis.

16. The imager assembly of claim 15, wherein said image sensor and at least one other device selected from the group comprising: an image sensor control logic; an A/D converter; a low voltage differential signal line driver; a temperature sensor; control output; a voltage regulator; a second image sensor; a microprocessor; a moisture sensor; and a compass are integrated in a common application specific integrated chip.

17. The imager assembly of claim 16, further comprising at least one shim positioned at least partially between said attachment member and said carrier to define a second image sensor optical axis.

18. The assembly of claim 15, further comprising at least one device selected from the group comprising: an electro-optic mirror element; an ambient light sensor; a glare light sensor; an information display; an indicator; a microphone; a compass; an operator interface; a temperature indicator; a Bluetooth interface; a wireless transceiver; a vehicle bus interface; a passenger side restraint status display; and an electro-optic mirror element control.

* * * * *